(12) United States Patent
Park et al.

(10) Patent No.: US 11,943,029 B2
(45) Date of Patent: Mar. 26, 2024

(54) METHOD FOR REPORTING CHANNEL STATE INFORMATION IN WIRELESS COMMUNICATION SYSTEM, AND DEVICE THEREFOR

(71) Applicant: LG ELECTRONICS INC., Seoul (KR)

(72) Inventors: Haewook Park, Seoul (KR); Hyungtae Kim, Seoul (KR); Jiwon Kang, Seoul (KR); Kijun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/527,411

(22) Filed: Nov. 16, 2021

(65) Prior Publication Data

US 2022/0149910 A1    May 12, 2022

Related U.S. Application Data

(63) Continuation of application No. 16/065,057, filed as application No. PCT/KR2018/000345 on Jan. 8, 2018, now Pat. No. 11,201,653.

(Continued)

(51) Int. Cl.
| | | |
|---|---|---|
| *H04B 7/06* | (2006.01) | |
| *H04L 27/18* | (2006.01) | |
| *H04W 24/08* | (2009.01) | |

(52) U.S. Cl.
CPC ........... *H04B 7/0626* (2013.01); *H04L 27/18* (2013.01); *H04W 24/08* (2013.01)

(58) Field of Classification Search
CPC .... H04B 7/0626; H04B 7/065; H04B 7/0456; H04L 27/18; H04L 5/0051; H04L 5/0057; H04L 1/0026; H04W 24/08; Y02D 30/70
See application file for complete search history.

(56) References Cited

U.S. PATENT DOCUMENTS

2011/0006949 A1 * 1/2011 Webb ..................... H01Q 3/267
342/368
2013/0258874 A1 10/2013 Khoshnevis et al.
(Continued)

FOREIGN PATENT DOCUMENTS

| CN | 104541535 | 4/2015 |
| CN | 104734753 | 6/2015 |

(Continued)

OTHER PUBLICATIONS

"LTE; Evolved Universal Terrestrial Radio Access (E-UTRA); Physical layer procedures (3GPP TS 36.213 version 10.13.0 Release 10)," ETSI TS 136 213 V10.13.0, Jul. 2015, 130 pages.

(Continued)

*Primary Examiner* — John D Blanton
(74) *Attorney, Agent, or Firm* — Fish & Richardson P.C.

(57) ABSTRACT

Disclosed herein is a method for reporting channel state information (CSI) of a terminal in a wireless communication system. The method includes: measuring a CSI-RS (reference signal) transmitted from a base station through multiple panels; and reporting CSI generated based on the CSI-RS measurement to the base station, wherein, when the terminal reports a WB (Wideband) panel corrector and SB (Subband) panel corrector for the multiple panels as the CSI, the WB panel corrector and the SB panel corrector are reported with different bit widths.

13 Claims, 24 Drawing Sheets

Related U.S. Application Data

(60) Provisional application No. 62/475,188, filed on Mar. 22, 2017, provisional application No. 62/444,309, filed on Jan. 9, 2017.

(56) References Cited

U.S. PATENT DOCUMENTS

| | | | |
|---|---|---|---|
| 2013/0322376 A1 | 12/2013 | Marinier et al. | |
| 2015/0215090 A1* | 7/2015 | Sayana | H04L 43/06 370/329 |
| 2015/0215928 A1* | 7/2015 | Davydov | H04B 7/065 370/329 |
| 2015/0381254 A1* | 12/2015 | Liang | H04B 7/0619 370/329 |
| 2016/0142117 A1* | 5/2016 | Rahman | H04B 7/0486 375/267 |
| 2016/0164588 A1 | 6/2016 | Chen | |
| 2016/0337073 A1 | 11/2016 | Kim et al. | |
| 2016/0373231 A1 | 12/2016 | Yoon et al. | |
| 2018/0024519 A1* | 1/2018 | Peluso | G05B 19/0426 340/679 |
| 2018/0219594 A1* | 8/2018 | Zhang | H04B 7/0617 |
| 2019/0229786 A1* | 7/2019 | Huang | H04B 7/06 |
| 2020/0336182 A1* | 10/2020 | Faxér | H04B 7/0639 |

FOREIGN PATENT DOCUMENTS

| | | |
|---|---|---|
| CN | 105991244 | 10/2016 |
| CN | 106134120 | 11/2016 |
| JP | 2014522194 | 8/2014 |
| JP | 2016539594 | 12/2016 |
| KR | 20120031894 | 4/2012 |
| KR | 20150035555 | 4/2015 |
| KR | 20150113933 | 10/2015 |
| KR | 20160129767 | 11/2016 |
| KR | 20160142876 | 12/2016 |
| WO | WO2015176209 | 11/2015 |

OTHER PUBLICATIONS

CN Office Action in Chinese Appln. No. 201880006166.0, dated May 31, 2021, 17 pages (with English translation).
Ericsson, "Type I Multi-panel CSI codebook," R1-1702684, 3GPP TSG-RAN WG1 #88, Athens, Greece, dated Feb. 13-17, 2017, 8 pages.
Extended European Search Report in European Application No. 18736139.9, dated Jul. 16, 2019, 10 pages.
IN Office Action in Indian Appln. No. 201927030806, dated Mar. 11, 2021, 8 pages (with English translation).
Liu, "Research on imperfect CSI feedback of MIMO system in high-speed train-ground communications," Southwest Jiaotong University, Master Degree Thesis, dated Apr. 2014, 60 pages (with English translation).
MCC Support, "Final Report of 3GPP TSG RAN WG1 #AH1_NR v1.0.0 (Spokane, USA, Jan. 16-20, 2017)," R1-1701553, 3GPP TSG RAN WG1 Meeting #88, Athens, Greece, Feb. 13-17, 2017, 106 pages.
Samardzija et al., "Unquantized and uncoded channel state information feedback in multiple-antenna multiuser systems," IEEE Transactions on Communications, vol. 54, No. 7, dated Jul. 17, 2006, 11 pages.
Samsung, "Linear combination (LC) codebook based CSI reporting and simulation results," R1-166734, 3GPP TSG RAN WG1 Meeting #86, Gothenburg, Sweden, dated Aug. 22-26, 2016, 10 pages.
Sesia et al., "LTE—The UMTS Long Term Evolution: From Theory to Practice," Second Edition, John Wiley & Sons, Ltd., 2011, Total pp. 794.

* cited by examiner

FIG. 8A
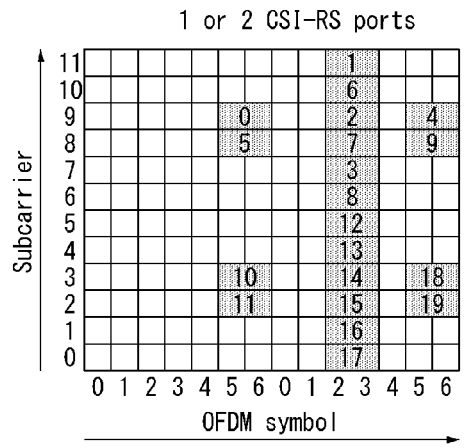
FIG. 8B
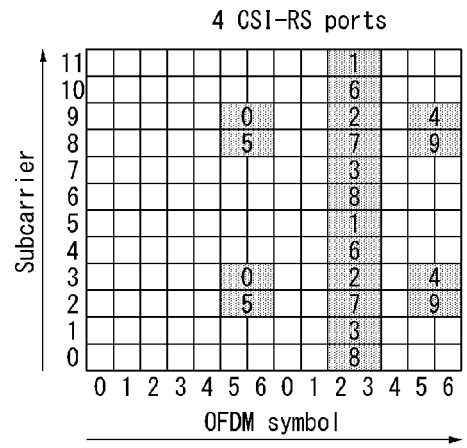
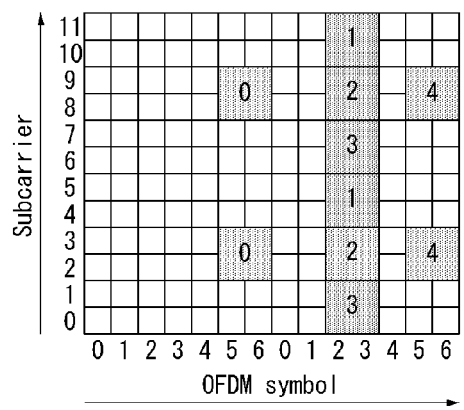
FIG. 8C

Pattern 2-1

Pattern 2-2

Pattern 2-3

Pattern 2-4

Pattern 4-1

Pattern 4-2

Pattern 4-3

Pattern 4-4

METHOD FOR REPORTING CHANNEL STATE INFORMATION IN WIRELESS COMMUNICATION SYSTEM, AND DEVICE THEREFOR

CROSS-REFERENCE TO RELATED APPLICATIONS

This application is a continuation of U.S. application Ser. No. 16/065,057, filed on Aug. 31, 2018, which is the National Stage filing under 35 U.S.C. 371 of International Application No. PCT/KR2018/00345, filed on Jan. 8, 2018, which claims the benefit of U.S. Provisional Application No. 62/444,309, filed on Jan. 9, 2017, and No. 62/475,188, filed on Mar. 22, 2017, the contents of which are all hereby incorporated by reference herein in their entirety.

TECHNICAL FIELD

The present invention relates to a wireless communication system, and more particularly, to a method for reporting channel state information and a device that performs/supports this method.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

SUMMARY

An object of the present invention is to provide a method for transmitting/receiving channel state information (CSI).

Furthermore, an object of the present invention provides a method for transmitting/receiving control configuration information which is transmitted to support the transmission/reception of channel state information of a terminal.

Furthermore, an object of the present invention provides various codebooks for CSI report/feedback. In particular, an object of the present invention provides a new codebook for supporting beamforming through multiple panels newly introduced in NR.

Technical problems to be solved by the present invention are not limited to the above-mentioned technical problems, and other technical problems not mentioned herein may be clearly understood by those skilled in the art from description below.

In an aspect of the present invention, there is provided a method for reporting channel state information (CSI) of a terminal in a wireless communication system. The method includes: measuring a CSI-RS (reference signal) transmitted from a base station through multiple panels; and reporting CSI generated based on the CSI-RS measurement to the base station, wherein, when the terminal reports a WB (Wideband) panel corrector and SB (Subband) panel corrector for the multiple panels as the CSI, the WB panel corrector and the SB panel corrector are reported with different bit widths.

Furthermore, the WB panel corrector and the SB panel corrector are used for phase correction between the multiple panels.

Furthermore, a bit width of the SB panel corrector is shorter than a bit width of the WB panel corrector.

Furthermore, the bit width of the SB panel corrector is 1 bit, and the bit width of the WB panel corrector is 2 bits.

Furthermore, the WB panel corrector is reported based on QPSK (quadrature phase-shift keying), and the SB panel corrector is reported based on BPSK (binary phase-shift keying).

Furthermore, when the reporting only the WB panel compensator as the CSI, the WB panel corrector is reported with a bit width of 2 bits.

Furthermore, the number of panels is set by higher-layer signaling.

Furthermore, the reporting of the WB panel corrector and/or the SB panel corrector is set by the higher-layer signalling.

Furthermore, the WB panel corrector and the SB panel corrector are reported in a PMI (Precoding Matrix Index) in the CSI.

Furthermore, the WB panel corrector and the SB panel corrector are reported independently for each of the multiple panels.

In another aspect of the present invention, there is provided a terminal that receives a channel state information-reference signal (CSI-RS) in a wireless communication system, the terminal including: a radio frequency (RF) unit for transmitting and receiving a radio signal; and a processor for controlling the RF unit, wherein the processor measures a CSI-RS (reference signal) transmitted from a base station through multiple panels, and reports CSI generated based on the CSI-RS measurement to the base station, wherein, when the terminal reports a WB (Wideband) panel corrector and SB (Subband) panel corrector for the multiple panels as the CSI, the WB panel corrector and the SB panel corrector are reported with different bit widths.

Furthermore, the WB panel corrector and the SB panel corrector are used for phase correction between the multiple panels.

Furthermore, a bit width of the SB panel corrector is shorter than a bit width of the WB panel corrector.

Furthermore, the bit width of the SB panel corrector is 1 bit, and the bit width of the WB panel corrector is 2 bits.

Furthermore, the WB panel corrector is reported based on QPSK (quadrature phase-shift keying), and the SB panel corrector is reported based on BPSK (binary phase-shift keying).

According to an exemplary embodiment of the present invention, a terminal may smoothly derive CSI and give feedback about it to a base station.

Furthermore, according to an exemplary embodiment of the present invention, a codebook for NR to which a multi-panel array is newly adapted is defined, thereby solving the ambiguity of which codebook is to be applied to NR.

Furthermore, according to an exemplary embodiment of the present invention, different bit widths are defined for a WB panel corrector and an SB panel corrector by taking SB characteristics into consideration. Thus, accurate CSI may be reported to the base station without significantly increasing signaling overhead.

Advantages of the following embodiments are not limited to the aforementioned advantages, and various other advantages may be evidently understood by those skilled in the art to which the embodiments pertain from the following description.

DESCRIPTION OF DRAWINGS

The accompanying drawings, which are included herein as a part of the description for help understanding the present invention, provide embodiments of the present invention, and describe the technical features of the present invention with the description below.

FIGS. 8A to 8C are diagrams illustrating resources to which reference signals are mapped in a wireless communication system to which the present invention may be applied.

FIGS. 9A to 9C illustrate resources to which reference signals are mapped in a wireless communication system to which the present invention is applicable.

DETAILED DESCRIPTION

Figure 1A:
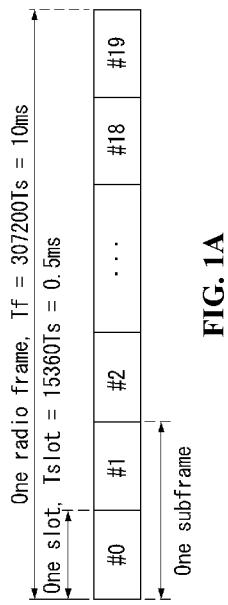
FIGS. 1A and 1B illustrate the structure of a radio frame in a wireless communication system to which the present invention may be applied.

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which the Present Invention May be Applied

Figure 1B:
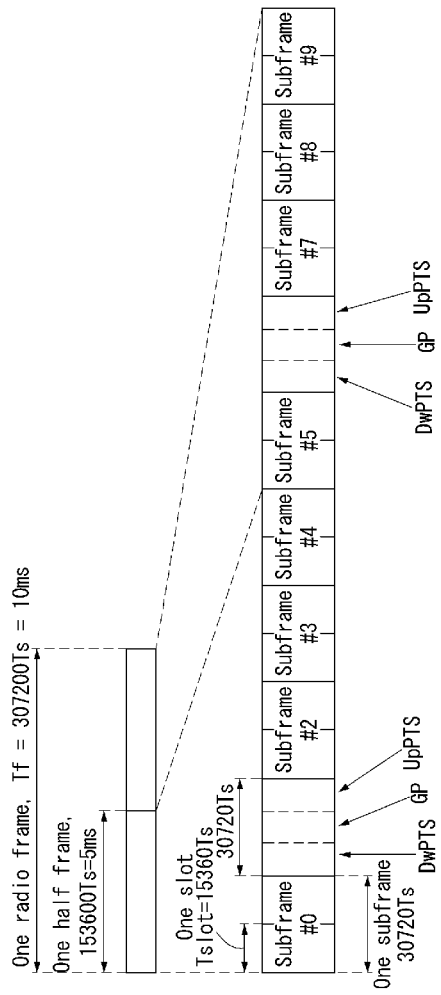

FIGS. 1A and 1B show the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$. A UL and DL transmission includes the radio frame having a duration of $T\_f=307200*T\_s=10$ ms.

FIG. 1A exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot 2i and slot 2i+1. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1B shows frame structure type 2.

A type 2 radio frame includes two half frame of $153600*T\_s=5$ ms length each. Each half frame includes 5 subframes of $30720*T\_s=1$ ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, '13' represents a subframe for a DL transmission, 'U' represents a subframe for UL transmission, and 'S' represents a special subframe including three types of fields including a Downlink Pilot Time Slot (DwPTS), a Guard Period (GP), and a Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of $T\_slot=15360*T\_s=0.5$ ms.

The UL-DL configuration may be classified into 7 types, and the position and/or the number of a DL subframe, a special subframe and a UL subframe are different for each configuration.

Table 2 represents configuration (length of DwPTS/GP/UpPTS) of a special subframe.

TABLE 2

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · T, | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · T, | | |
| 7 | 21952 · $T_s$ | | | — | — | — |
| 8 | 24144 · $T_s$ | | | — | — | — |

The structure of a radio subframe according to the example of FIGS. 1A and 1B are just an example, and the number of subcarriers included in a radio frame, the number of slots included in a subframe and the number of OFDM symbols included in a slot may be changed in various manners.

Figure 2:
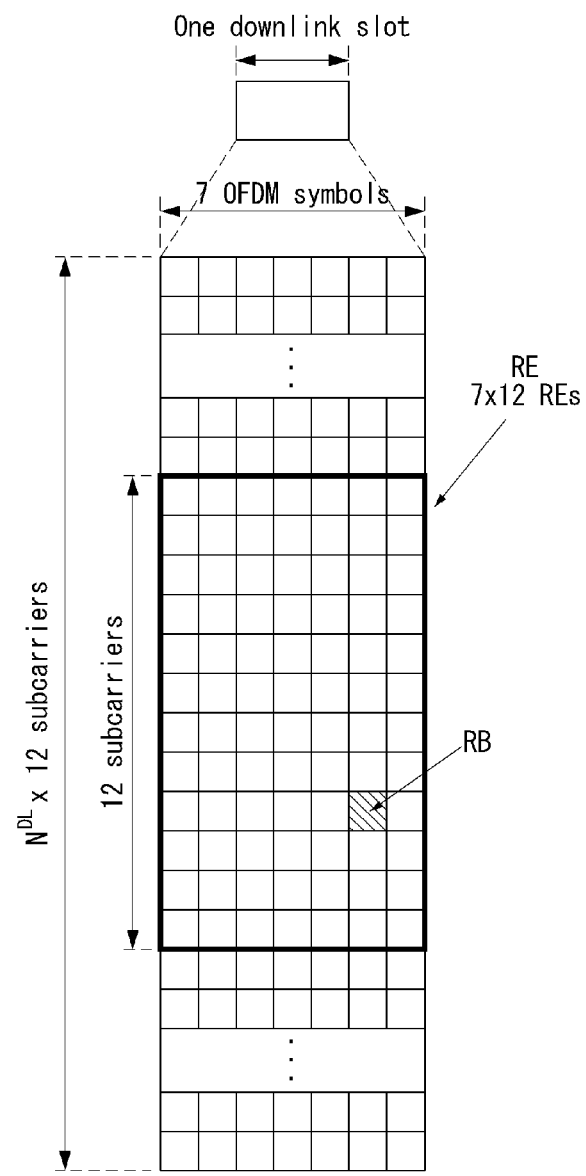
FIG. 2 is a diagram illustrating a resource grid for a downlink slot in a wireless communication system to which the present invention may be applied.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs $N^{DL}$ included in a downlink slot depends on a downlink transmission bandwidth.

The structure of an uplink slot may be the same as that of a downlink slot.

Figure 3:
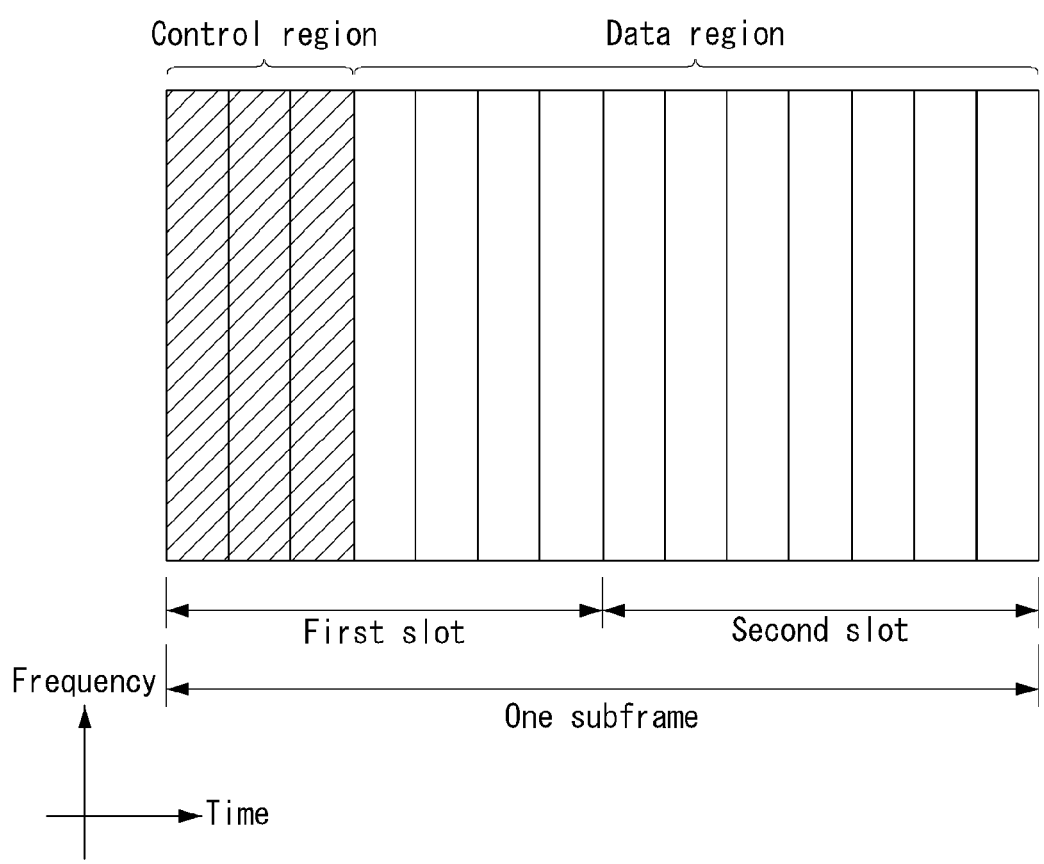
FIG. 3 illustrates a structure of downlink subframe in a wireless communication system to which the present invention may be applied.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

Figure 4:
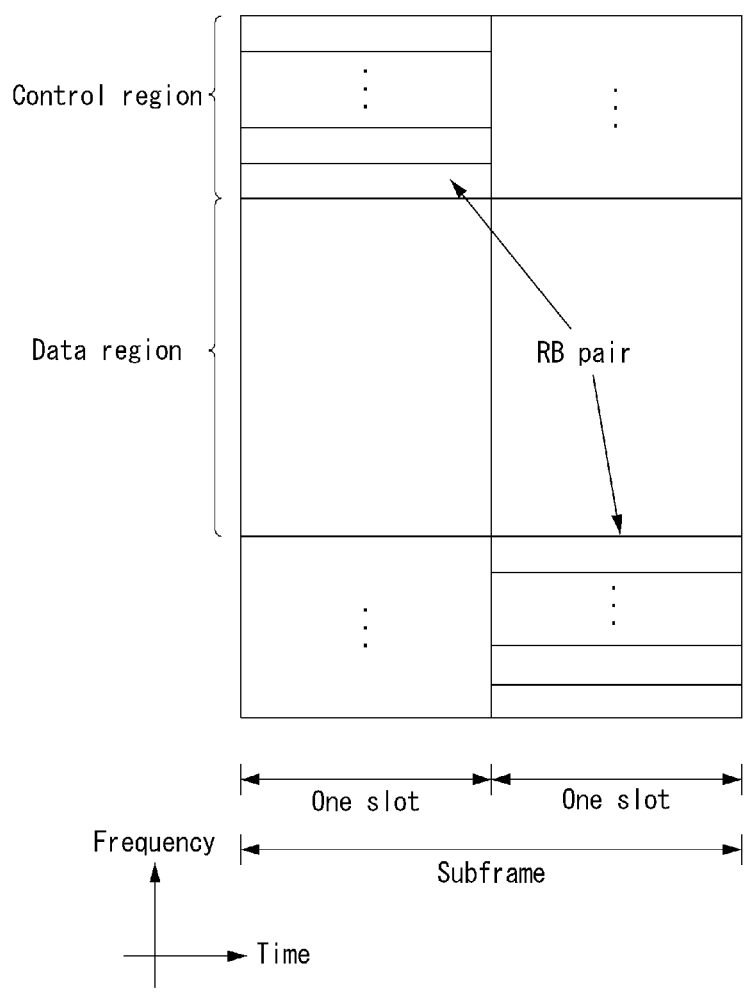
FIG. 4 illustrates a structure of uplink subframe in a wireless communication system to which the present invention may be applied.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna.".

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

Meanwhile, the multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

Figure 5:
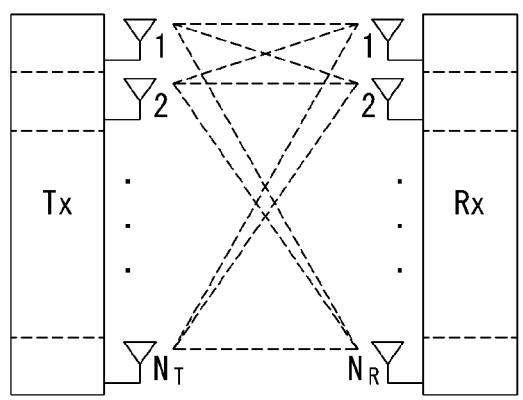
FIG. 5 shows the configuration of a known MIMO communication system.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R) \quad \text{[Equation 1]}$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case may include a Maximum Likelihood Detection (MLD) receiver, a Zero-Forcing (ZF) receiver, a Minimum Mean Square Error (MMSE) receiver, Diagonal-Bell Laboratories Layered Space-Time (D-BLAST), and Vertical-Bell Laboratories Layered Space-Time (V-BLAST). In particular, if a transmission end can be aware of channel information, a Singular Value Decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and NR reception antennas are present.

First, a transmission signal is described below. If the N_T transmission antennas are present as described above, a maximum number of pieces of information which can be transmitted are N_T, which may be represented using the following vector.

$$s = [s_1, s_2, \ldots, s_{N_T}] \quad \text{[Equation 2]}$$

Meanwhile, transmission power may be different in each of pieces of transmission information s_1, s_2, . . . , s_NT. In this case, if pieces of transmission power are P_1, P_2, . . . , P_NT, transmission information having controlled transmission power may be represented using the following vector.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Furthermore, transmission information having controlled transmission power in the Equation 3 may be represented as follows using the diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, the information vector having controlled transmission power in the Equation 4 is multiplied by a weight matrix W, thus forming N_T transmission signals x_1, x_2, . . . , x_NT that are actually transmitted. In this case, the weight matrix functions to properly distribute the transmission information to antennas according to a transport channel condition. The following may be represented using the transmission signals x_1, x_2, . . . , x_NT.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In this case, w_ij denotes weight between the i-th transmission antenna and the j-th transmission information, and W is an expression of a matrix of the weight. Such a matrix W is called a weight matrix or precoding matrix.

Meanwhile, the transmission signal x, such as that described above, may be considered to be used in a case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, . . . , y_NR of the respective antennas are represented as follows using a vector y.

$$y = [y_1, y_2, \ldots, y_{N_R}]^T \quad \text{[Equation 6]}$$

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

Figure 6:
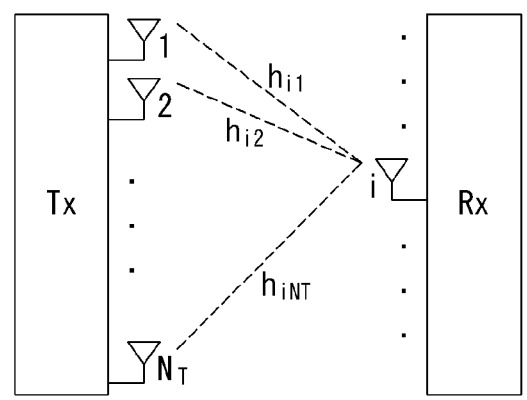
FIG. 6 is a diagram showing a channel from a plurality of transmission antennas to a single reception antenna.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T = [h_{i1}, h_{i2}, \ldots, h_{iN_T}] \quad \text{[Equation 7]}$$

Furthermore, if all channels from the N_T transmission antenna to NR reception antennas are represented through a matrix expression, such as Equation 7, they may be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \quad \text{[Equation 8]}$$

Meanwhile, Additive White Gaussian Noise (AWGN) is added to an actual channel after the actual channel experiences the channel matrix H. Accordingly, AWGN n_1, n_2, . . . , n_NR added to the N_R reception antennas, respectively, are represented using a vector as follows.

$$n = [n_1, n_2, \ldots, n_{N_R}]^T \quad \text{[Equation 9]}$$

A transmission signal, a reception signal, a channel, and AWGN in a multi-input/output antenna communication system may be represented to have the following relationship through the modeling of the transmission signal, reception signal, channel, and AWGN, such as those described above.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

Meanwhile, the number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \leq \min(N_T, N_R) \quad \text{[Equation 11]}$$

Furthermore, if a matrix is subjected to Eigen value decomposition, a rank may be defined as the number of Eigen values that belong to Eigen values and that are not 0. Likewise, if a rank is subjected to Singular Value Decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Reference Signal (RS)

In a wireless communication system, a signal may be distorted during transmission because data is transmitted through a radio channel. In order for a reception end to accurately receive a distorted signal, the distortion of a received signal needs to be corrected using channel information. In order to detect channel information, a method of detecting channel information using the degree of the distortion of a signal transmission method and a signal known to both the transmission side and the reception side when they are transmitted through a channel is chiefly used. The aforementioned signal is called a pilot signal or reference signal (RS).

Furthermore recently, when most of mobile communication systems transmit a packet, they use a method capable of improving transmission/reception data efficiency by adopting multiple transmission antennas and multiple reception antennas instead of using one transmission antenna and one reception antenna used so far. When data is transmitted and received using multiple input/output antennas, a channel state between the transmission antenna and the reception antenna must be detected in order to accurately receive the signal. Accordingly, each transmission antenna must have an individual reference signal.

In a mobile communication system, an RS may be basically divided into two types depending on its object. There are an RS having an object of obtaining channel state information and an RS used for data demodulation. The former has an object of obtaining, by a UE, to obtain channel state information in the downlink. Accordingly, a corresponding RS must be transmitted in a wideband, and a UE must be capable of receiving and measuring the RS although the UE does not receive downlink data in a specific subframe. Furthermore, the former is also used for radio resources management (RRM) measurement, such as handover. The latter is an RS transmitted along with corresponding resources when an eNB transmits the downlink. A UE may perform channel estimation by receiving a corresponding RS and thus may demodulate data. The corresponding RS must be transmitted in a region in which data is transmitted.

A downlink RS includes one common RS (CRS) for the acquisition of information about a channel state shared by all of UEs within a cell and measurement, such as handover, and a dedicated RS (DRS) used for data demodulation for only a specific UE. Information for demodulation and channel measurement can be provided using such RSs. That is, the DRS is used for only data demodulation, and the CRS is used for the two objects of channel information acquisition and data demodulation.

The reception side (i.e., UE) measures a channel state based on a CRS and feeds an indicator related to channel quality, such as a channel quality indicator (CQI), a precoding matrix index (PMI) and/or a rank indicator (RI), back to the transmission side (i.e., an eNB). The CRS is also called a cell-specific RS. In contrast, a reference signal related to the feedback of channel state information (CSI) may be defined as a CSI-RS.

The DRS may be transmitted through resource elements if data on a PDSCH needs to be demodulated. A UE may receive information about whether a DRS is present through a higher layer, and the DRS is valid only if a corresponding PDSCH has been mapped. The DRS may also be called a UE-specific RS or demodulation RS (DMRS).

Figure 7A:
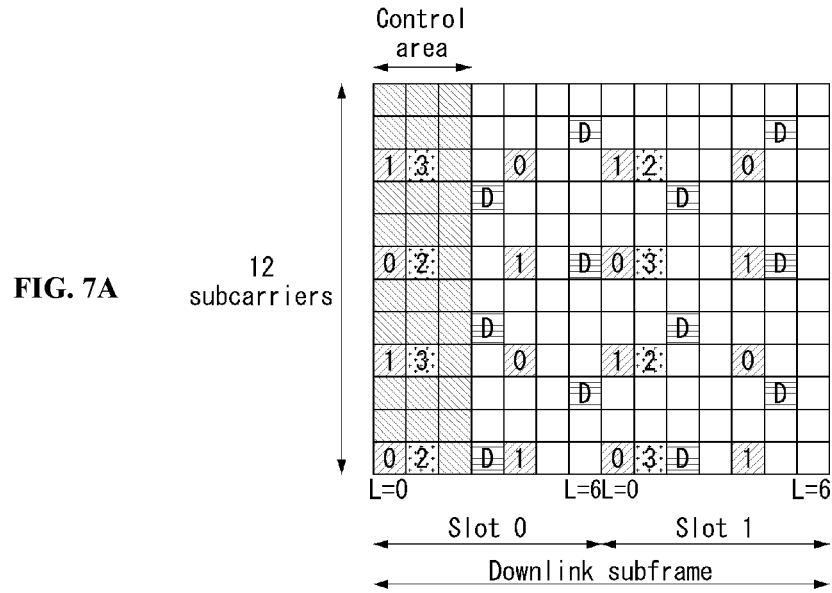
FIGS. 7A and 7B illustrate reference signal patterns mapped to downlink resource block pairs in a wireless communication system to which the present invention may be applied.
Figure 7B:
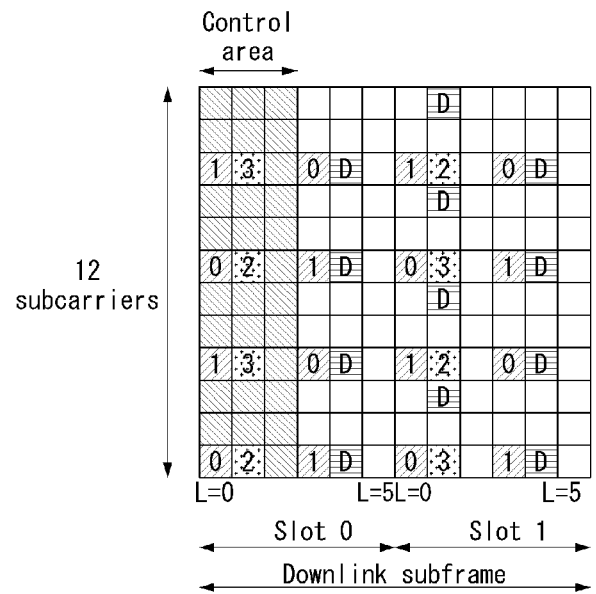

FIGS. 7A and 7B illustrate reference signal patterns mapped to downlink resource block pairs in a wireless communication system to which the present invention may be applied.

Referring to FIGS. 7A and 7B, a downlink resource block pair, that is, a unit in which a reference signal is mapped, may be represented in the form of one subframe in a time domain X 12 subcarriers in a frequency domain. That is, in a time axis (an x axis), one resource block pair has a length of 14 OFDM symbols in the case of a normal cyclic prefix (CP) (FIG. 7A) and has a length of 12 OFDM symbols in the case of an extended cyclic prefix (CP) (FIG. 7B). In the resource block lattice, resource elements (REs) indicated by "0", "1", "2", and "3" mean the locations of the CRSs of antenna port indices "0", "1", "2", and "3", respectively, and REs indicated by "D" mean the location of a DRS.

If an eNB uses a single transmission antenna, reference signals for a single antenna port are arrayed.

If an eNB uses two transmission antennas, reference signals for two transmission antenna ports are arrayed using a time division multiplexing (TDM) scheme and/or a frequency division multiplexing (FDM) scheme. That is, different time resources and/or different frequency resources are allocated in order to distinguish between reference signals for two antenna ports.

Furthermore, if an eNB uses four transmission antennas, reference signals for four transmission antenna ports are arrayed using the TDM and/or FDM schemes. Channel information measured by the reception side (i.e., UE) of a downlink signal may be used to demodulate data transmitted using a transmission scheme, such as single transmission antenna transmission, transmission diversity, closed-loop spatial multiplexing, open-loop spatial multiplexing or a multi-user-multi-input/output (MIMO) antenna.

If a multi-input multi-output antenna is supported, when a RS is transmitted by a specific antenna port, the RS is transmitted in the locations of resource elements specified depending on a pattern of the RS and is not transmitted in the locations of resource elements specified for other antenna ports. That is, RSs between different antennas do not overlap.

In an LTE-A system, that is, an advanced and developed form of the LTE system, the design is necessary to support a maximum of eight transmission antennas in the downlink of an eNB. Accordingly, RSs for the maximum of eight transmission antennas must be also supported. In the LTE system, only downlink RSs for a maximum of four antenna ports has been defined. Accordingly, if an eNB has four to a maximum of eight downlink transmission antennas in the LTE-A system, RSs for these antenna ports must be additionally defined and designed. Regarding the RSs for the maximum of eight transmission antenna ports, the aforementioned RS for channel measurement and the aforementioned RS for data demodulation must be designed.

One of important factors that must be considered in designing an LTE-A system is backward compatibility, that is, that an LTE UE must well operate even in the LTE-A system, which must be supported by the system. From an RS transmission viewpoint, in the time-frequency domain in which a CRS defined in LTE is transmitted in a full band every subframe, RSs for a maximum of eight transmission antenna ports must be additionally defined. In the LTE-A system, if an RS pattern for a maximum of eight transmission antennas is added in a full band every subframe using the same method as the CRS of the existing LTE, RS overhead is excessively increased.

Accordingly, the RS newly designed in the LTE-A system is basically divided into two types, which include an RS having a channel measurement object for the selection of MCS or a PMI (channel state information-RS or channel state indication-RS (CSI-RS)) and an RS for the demodulation of data transmitted through eight transmission antennas (data demodulation-RS (DM-RS)).

The CSI-RS for the channel measurement object is characterized in that it is designed for an object focused on channel measurement unlike the existing CRS used for objects for measurement, such as channel measurement and handover, and for data demodulation. Furthermore, the CSI-RS may also be used for an object for measurement, such as handover. The CSI-RS does not need to be transmitted every subframe unlike the CRS because it is transmitted for an object of obtaining information about a channel state. In order to reduce overhead of a CSI-RS, the CSI-RS is intermittently transmitted on the time axis.

In the LTE-A system, a maximum of eight transmission antennas are supported in the downlink of an eNB. In the LTE-A system, if RSs for a maximum of eight transmission antennas are transmitted in a full band every subframe using the same method as the CRS in the existing LTE, RS overhead is excessively increased. Accordingly, in the LTE-A system, an RS has been separated into the CSI-RS of the CSI measurement object for the selection of MCS or a PMI and the DM-RS for data demodulation, and thus the two RSs have been added. The CSI-RS may also be used for an object, such as RRM measurement, but has been designed for a main object for the acquisition of CSI. The CSI-RS does not need to be transmitted every subframe because it is not used for data demodulation. Accordingly, in order to reduce overhead of the CSI-RS, the CSI-RS is intermittently transmitted on the time axis. That is, the CSI-RS has a period corresponding to a multiple of the integer of one subframe and may be periodically transmitted or transmitted in a specific transmission pattern. In this case, the period or pattern in which the CSI-RS is transmitted may be set by an eNB.

In order to measure a CSI-RS, a UE must be aware of information about the transmission subframe index of the CSI-RS for each CSI-RS antenna port of a cell to which the UE belongs, the location of a CSI-RS resource element (RE) time-frequency within a transmission subframe, and a CSI-RS sequence.

In the LTE-A system, an eNB has to transmit a CSI-RS for each of a maximum of eight antenna ports. Resources used for the CSI-RS transmission of different antenna ports must be orthogonal. When one eNB transmits CSI-RSs for different antenna ports, it may orthogonally allocate the resources according to the FDM/TDM scheme by mapping the CSI-RSs for the respective antenna ports to different REs. Alternatively, the CSI-RSs for different antenna ports may be transmitted according to the CDM scheme for mapping the CSI-RSs to pieces of code orthogonal to each other.

When an eNB notifies a UE belonging to the eNB of information on a CSI-RS, first, the eNB must notify the UE of information about a time-frequency in which a CSI-RS for each antenna port is mapped. Specifically, the information includes subframe numbers in which the CSI-RS is transmitted or a period in which the CSI-RS is transmitted, a subframe offset in which the CSI-RS is transmitted, an OFDM symbol number in which the CSI-RS RE of a specific antenna is transmitted, frequency spacing, and the offset or shift value of an RE in the frequency axis.

A CSI-RS is transmitted through one, two, four or eight antenna ports. Antenna ports used in this case are p=15, p=15, 16, p=15, . . . , 18, and p=15, . . . , 22, respectively. A CSI-RS may be defined for only a subcarrier interval Δf=15 kHz.

In a subframe configured for CSI-RS transmission, a CSI-RS sequence is mapped to a complex-valued modulation symbol a k,l^(p) used as a reference symbol on each antenna port p as in Equation 12.

[Equation 12]

$$a_{k,l}^{(p)} = w_{l''} \cdot r_{l,n_s}(m')$$

$$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l'' + \begin{cases} l'' & \text{CSI reference signal configurations 0-19, normal cyclic prefix} \\ 2l'' & \text{CSI reference signal configurations 20-31, normal cyclic prefix} \\ l'' & \text{CSI reference signal configurations 0-27, extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 12, (k',l') (wherein k' is a subcarrier index within a resource block and l' indicates an OFDM symbol index within a slot.) and the condition of n_s is determined depending on a CSI-RS configuration, such as Table 3 or Table 4.

Table 3 illustrates the mapping of (k',l') from a CSI-RS configuration in a normal CP.

TABLE 3

| CSI reference signal configuration | Number of CSI reference signals configured | | | | | |
|---|---|---|---|---|---|---|
| | 1 or 2 | | 4 | | 8 | |
| | (k',l') | n_s mod 2 | (k',l') | n_s mod 2 | (k',l') | n_s mod 2 |
| Frame structure type 1 and 2 | | | | | | |
| 0 | (9,5) | 0 | (9,5) | 0 | (9,5) | 0 |
| 1 | (11,2) | 1 | (11,2) | 1 | (11,2) | 1 |
| 2 | (9,2) | 1 | (9,2) | 1 | (9,2) | 1 |
| 3 | (7,2) | 1 | (7,2) | 1 | (7,2) | 1 |
| 4 | (9,5) | 1 | (9,5) | 1 | (9,5) | 1 |
| 5 | (8,5) | 0 | (8,5) | 0 | | |
| 6 | (10,2) | 1 | (10,2) | 1 | | |
| 7 | (8,2) | 1 | (8,2) | 1 | | |
| 8 | (6,2) | 1 | (6,2) | 1 | | |
| 9 | (8,5) | 1 | (8,5) | 1 | | |
| 10 | (3,5) | 0 | | | | |
| 11 | (2,5) | 0 | | | | |
| 12 | (5,2) | 1 | | | | |
| 13 | (4,2) | 1 | | | | |
| 14 | (3,2) | 1 | | | | |
| 15 | (2,2) | 1 | | | | |
| 16 | (1,2) | 1 | | | | |
| 17 | (0,2) | 1 | | | | |
| 18 | (3,5) | 1 | | | | |
| 19 | (2,5) | 1 | | | | |
| Frame structure type 2 only | | | | | | |
| 20 | (11,1) | 1 | (11,1) | 1 | (11,1) | 1 |
| 21 | (9,1) | 1 | (9,1) | 1 | (9,1) | 1 |
| 22 | (7,1) | 1 | (7,1) | 1 | (7,1) | 1 |
| 23 | (10,1) | 1 | (10,1) | 1 | | |
| 24 | (8,1) | 1 | (8,1) | 1 | | |
| 25 | (6,1) | 1 | (6,1) | 1 | | |
| 26 | (5,1) | 1 | | | | |
| 27 | (4,1) | 1 | | | | |
| 28 | (3,1) | 1 | | | | |
| 29 | (2,1) | 1 | | | | |
| 30 | (1,1) | 1 | | | | |
| 31 | (0,1) | 1 | | | | |

Table 4 illustrates the mapping of (k',l') from a CSI-RS configuration in an extended CP.

TABLE 4

| CSI reference signal configuration | Number of CSI reference signals configured | | | | | |
|---|---|---|---|---|---|---|
| | 1 or 2 | | 4 | | 8 | |
| | (k',l') | n_s mod 2 | (k',l') | n_s mod 2 | (k',l') | n_s mod 2 |
| Frame structure type 1 and 2 | | | | | | |
| 0 | (11,4) | 0 | (11,4) | 0 | (11,4) | 0 |
| 1 | (9,4) | 0 | (9,4) | 0 | (9,4) | 0 |
| 2 | (10,4) | 1 | (10,4) | 1 | (10,4) | 1 |
| 3 | (9,4) | 1 | (9,4) | 1 | (9,4) | 1 |
| 4 | (5,4) | 0 | (5,4) | 0 | | |

TABLE 4-continued

| CSI reference signal configuration | Number of CSI reference signals configured | | | | | |
|---|---|---|---|---|---|---|
| | 1 or 2 | | 4 | | 8 | |
| | (k',l') | $n_s$ mod 2 | (k',l') | $n_s$ mod 2 | (k',l') | $n_s$ mod 2 |
| 5 | (3,4) | 0 | (3,4) | 0 | | |
| 6 | (4,4) | 1 | (4,4) | 1 | | |
| 7 | (3,4) | 1 | (3,4) | 1 | | |
| 8 | (8,4) | 0 | | | | |
| 9 | (6,4) | 0 | | | | |
| 10 | (2,4) | 0 | | | | |
| 11 | (0,4) | 0 | | | | |
| 12 | (7,4) | 1 | | | | |
| 13 | (6,4) | 1 | | | | |
| 14 | (1,4) | 1 | | | | |
| 15 | (0,4) | 1 | | | | |
| Frame struc | | | | | | |
| 16 | (11,1) | 1 | (11,1) | 1 | (11,1) | 1 |
| 17 | (10,1) | 1 | (10,1) | 1 | (10,1) | 1 |
| 18 | (9,1) | 1 | (9,1) | 1 | (9,1) | 1 |
| 19 | (5,1) | 1 | (5,1) | 1 | | |
| 20 | (4,1) | 1 | (4,1) | 1 | | |
| 21 | (3,1) | 1 | (3,1) | 1 | | |
| 22 | (8,1) | 1 | | | | |
| 23 | (7,1) | 1 | | | | |
| 24 | (6,1) | 1 | | | | |
| 25 | (2,1) | 1 | | | | |
| 26 | (1,1) | 1 | | | | |
| 27 | (0,1) | 1 | | | | |

Referring to Table 3 and Table 4, in the transmission of a CSI-RS, in order to reduce inter-cell interference (ICI) in a multi-cell environment including a heterogeneous network (HetNet) environment, a maximum of 32 different configurations (in the case of a normal CP) or a maximum of 28 different configurations (in the case of an extended CP) are defined.

The CSI-RS configuration is different depending on the number of antenna ports and a CP within a cell, and a neighboring cell may have a maximum of different configurations. Furthermore, the CSI-RS configuration may be divided into a case where it is applied to both an FDD frame and a TDD frame and a case where it is applied to only a TDD frame depending on a frame structure.

(k',l') and n_s are determined depending on a CSI-RS configuration based on Table 3 and Table 4, and time-frequency resources used for CSI-RS transmission are determined depending on each CSI-RS antenna port.

FIGS. 8A to 8C are diagrams illustrating resources to which reference signals are mapped in a wireless communication system to which the present invention may be applied. Particularly, FIGS. 8A to 8C illustrate CSI-RS patterns for cases in which the number of CSI-RS antenna ports is 1 or 2, 4 and 8 in a subframe to which a normal CP is applied.

FIG. 8A shows twenty types of CSI-RS configurations available for CSI-RS transmission by one or two CSI-RS antenna ports, FIG. 8B shows ten types of CSI-RS configurations available for four CSI-RS antenna ports, and FIG. 8C shows five types of CSI-RS configurations available for eight CSI-RS antenna ports.

As described above, radio resources (i.e., an RE pair) in which a CSI-RS is transmitted are determined depending on each CSI-RS configuration.

If one or two antenna ports are configured for CSI-RS transmission with respect to a specific cell, the CSI-RS is transmitted on radio resources on a configured CSI-RS configuration of the twenty types of CSI-RS configurations shown in FIG. 8A.

Likewise, when four antenna ports are configured for CSI-RS transmission with respect to a specific cell, a CSI-RS is transmitted on radio resources on a configured CSI-RS configuration of the ten types of CSI-RS configurations shown in FIG. 8B. Furthermore, when eight antenna ports are configured for CSI-RS transmission with respect to a specific cell, a CSI-RS is transmitted on radio resources on a configured CSI-RS configuration of the five types of CSI-RS configurations shown in FIG. 8C.

A CSI-RS for each antenna port is subjected to CDM (Code Division Multiplexing) for every two antenna ports (i.e., {15,16}, {17,18}, {19,20} and {21,22}) on the same radio resources and transmitted. For example, in the case of antenna ports 15 and 16, CSI-RS complex symbols for the respective antenna ports 15 and 16 are the same, but are multiplied by different types of orthogonal code (e.g., Walsh code) and mapped to the same radio resources. The complex symbol of the CSI-RS for the antenna port 15 is multiplied by [1, 1], and the complex symbol of the CSI-RS for the antenna port 16 is multiplied by [1 −1] and mapped to the same radio resources. The same is true of the antenna ports {17,18}, {19,20} and {21,22}.

A UE may detect a CSI-RS for a specific antenna port by multiplying code by which a transmitted symbol has been multiplied. That is, a transmitted symbol is multiplied by the code [1 1] multiplied in order to detect the CSI-RS for the antenna port 15, and a transmitted symbol is multiplied by the code [1 −1] multiplied in order to detect the CSI-RS for the antenna port 16.

Referring to FIGS. 8A to 8C, in the case of the same CSI-RS configuration index, radio resources according to a CSI-RS configuration having a large number of antenna ports include radio resources having a small number of CSI-RS antenna ports. For example, in the case of a CSI-RS configuration 0, radio resources for the number of eight antenna ports include both radio resources for the number of four antenna ports and radio resources for the number of one or two antenna ports.

Figures 9A, 9B, 9C:
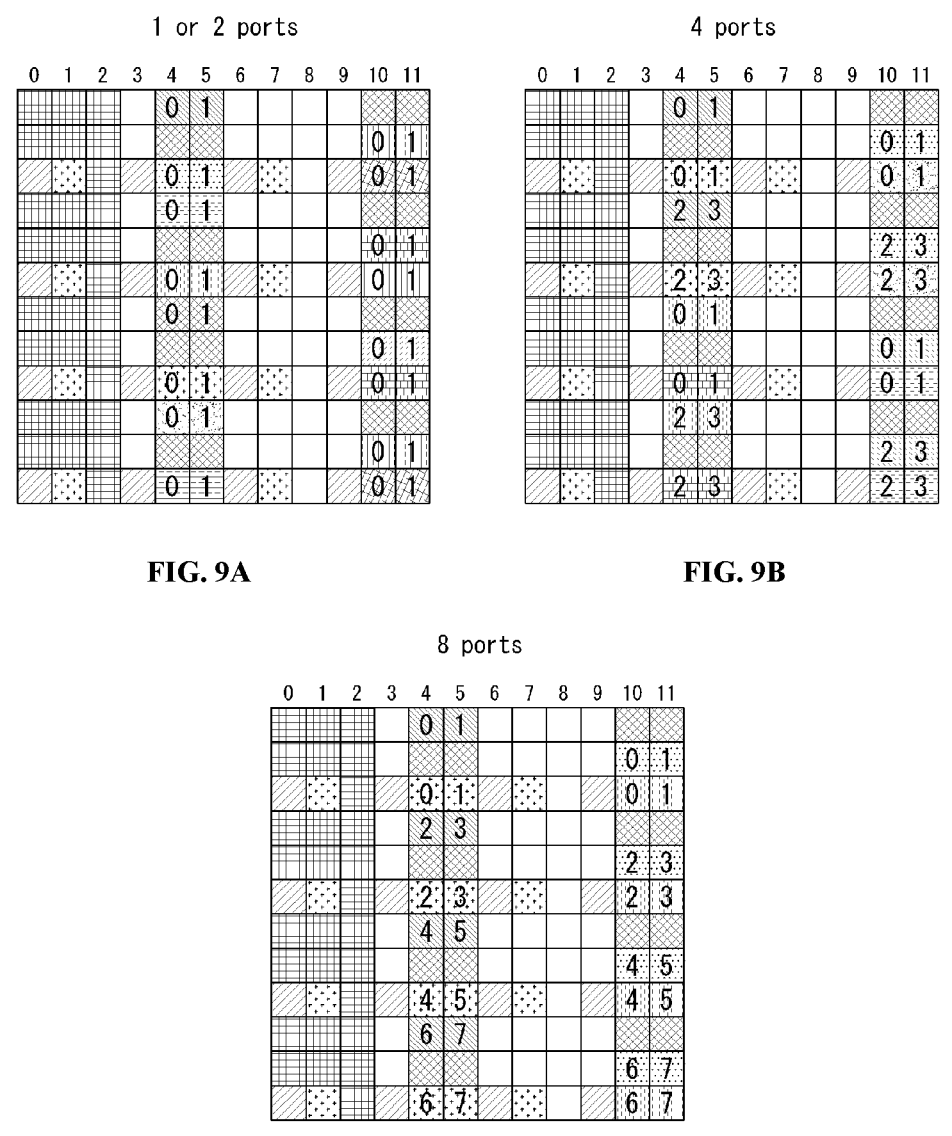

FIGS. 9A to 9C illustrate resources to which reference signals are mapped in a wireless communication system to which the present invention is applicable.

Particularly, FIGS. 9A to 9C show CSI-RS patterns for cases in which the number of CSI-RS antenna ports is 1 or 2, 4 and 8 in a subframe to which an extended CP is applied.

FIG. 9A shows 16 CSI-RS configurations which can be used for CSI-RS transmission through 1 or 2 CSI-RS antenna ports, FIG. 9B shows 8 CSI-RS configurations which can be used for CSI-RS transmission through 4 CSI-RS antenna ports, and FIG. 9C shows 4 CSI-RS configurations which can be used for CSI-RS transmission through 8 CSI-RS antenna ports.

In this manner, radio resources (i.e., RE pairs) for CSI-RS transmission are determined depending on each CSI-RS configuration.

When one or two antenna ports are set for CSI-RS transmission for a specific cell, CSI-RSs are transmitted on radio resources according to a set CSI-RS configuration among the 16 CSI-RS configurations shown in FIG. 9A.

Similarly, when 4 antenna ports are set for CSI-RS transmission for a specific cell, CSI-RSs are transmitted on radio resources according to a set CSI-RS configuration among the 8 CSI-RS configurations shown in FIG. 9B. Further, when 8 antenna ports are set for CSI-RS transmission for a specific cell, CSI-RSs are transmitted on radio resources according to a set CSI-RS configuration among the 4 CSI-RS configurations shown in FIG. 9C. A plurality of CSI-RS configurations may be used in a single cell. Only zero or one CSI-RS configuration may be used for a non-zero power (NZP) CSI-RS and zero or multiple CSI-RS configurations may be used for a zero power (ZP) CSI-RS.

For each bit set to 1 in a zero-power (ZP) CSI-RS ('ZeroPowerCSI-RS') that is a bitmap of 16 bits configured by a high layer, a UE assumes zero transmission power in REs (except a case where an RE overlaps an RE assuming a NZP CSI-RS configured by a high layer) corresponding to the four CSI-RS columns of Table 3 and Table 4. The most significant bit (MSB) corresponds to the lowest CSI-RS configuration index, and next bits in the bitmap sequentially correspond to next CSI-RS configuration indices.

A CSI-RS is transmitted only in a downlink slot that satisfies the condition of (n_s mod 2) in Table 3 and Table 4 and a subframe that satisfies the CSI-RS subframe configurations.

In the case of the frame structure type 2 (TDD), a CSI-RS is not transmitted in a special subframe, a synchronization signal (SS), a subframe colliding against a PBCH or SystemInformationBlockType1 (SIB 1) Message transmission or a subframe configured to paging message transmission.

Furthermore, an RE in which a CSI-RS for any antenna port belonging to an antenna port set S (S={15}, S={15,16}, S={17,18}, S={19,20} or S={21,22}) is transmitted is not used for the transmission of a PDSCH or for the CSI-RS transmission of another antenna port.

Time-frequency resources used for CSI-RS transmission cannot be used for data transmission. Accordingly, data throughput is reduced as CSI-RS overhead is increased. By considering this, a CSI-RS is not configured to be transmitted every subframe, but is configured to be transmitted in each transmission period corresponding to a plurality of subframes. In this case, CSI-RS transmission overhead can be significantly reduced compared to a case where a CSI-RS is transmitted every subframe.

A subframe period (hereinafter referred to as a "CSI transmission period") T CSI-RS and a subframe offset Δ_CSI-RS for CSI-RS transmission are shown in Table 5.

Table 5 illustrates CSI-RS subframe configurations.

TABLE 5

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
| --- | --- | --- |
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Referring to Table 5, CSI-RS periodicity TCSI-RS and a subframe offset ΔCSI-RS are determined depending on CSI-RS subframe configuration ICSI-RS.

The CSI-RS subframe configuration in Table 5 may be set to one of the aforementioned 'SubframeConfig' field and 'zeroTxPowerSubframeConfig' field. The CSI-RS subframe configuration may be separately set for an NZP CSI-RS and a ZP CSI-RS.

A subframe including a CSI-RS satisfies Equation 13.

$$(10 n_f + \lfloor n_s/2 \rfloor - \Delta_{CSI\_RS}) \bmod T_{CSI\_RS} = 0 \quad \text{[Equation 13]}$$

In Equation 13, TCSI-RS indicates CSI-RS periodicity, ΔCSI-RS indicates a subframe offset value, of denotes a system frame number, and ns denotes a slot number.

In the case of a UE for which transmission mode 9 is set with respect to a serving cell, a single CSI-RS resource configuration may be set for the UE. In the case of a UE for which transmission mode 10 is set with respect to the serving cell, one or more CSI-RS resource configurations may be set for the UE.

CSI-RS Configuration

In the current LTE standard, CSI-RS configuration parameters include antennaPortsCount, subframeConfig, resourceConfig, etc. These parameters indicate the number of antenna ports used to transmit CSI-RS, the period and offset of a subframe for transmitting CSI-RS, and a transmitted RE location (frequency and OFDM symbol index) in the corresponding subframe. Particularly, when a base station delivers specific CSI-RS configuration to a UE, it delivers the following parameters/information.

antennaPortsCount: A parameter representing the number of antenna ports used for transmission of CSI reference signals (e.g., 1 CSI-RS port, 2 CSI-RS ports, 4 CSI-RS ports, 8 CSI-RS ports, etc.).

resourceConfig: A parameter associated with the location of resources allocated for CSI-RS.

subframeConfig: A parameter associated with the period and offset of a subframe for transmitting CSI-RS.

p-C: Regarding UE assumption on reference PDSCH transmitted power for CSI feedback CSI-RS, Pc is the assumed ratio of PDSCH EPRE to CSI-RS EPRE when UE derives CSI feedback and takes values in the range of [−8, 15] dB with 1 dB step size.

zeroTxPowerResourceConfigList: A parameter associated with zero-power CSI-RS configuration.

zeroTxPowerSubframeConfig: A parameter associated with the period and offset of a subframe for transmitting zero-power CSI-RS.

Massive MIMO

A MIMO system having a plurality of antennas may be called a massive MIMO system and attracts attention as a means for improving spectral efficiency, energy efficiency and processing complexity.

Recently, the massive MIMO system has been discussed in order to meet requirements for spectral efficiency of future mobile communication systems in 3GPP. Massive MIMO is also called full-dimension MIMO (FD-MIMO).

LTE release-12 and following wireless communication systems consider introduction of an active antenna system (AAS).

Distinguished from conventional passive antenna systems in which an amplifier capable of adjusting the phase and magnitude of a signal is separated from an antenna, the AAS is configured in such a manner that each antenna includes an active element such as an amplifier.

The AAS does not require additional cables, connectors and hardware for connecting amplifiers and antennas and thus has high energy efficiency and low operation costs. Particularly, the AAS supports electronic beam control per antenna and thus can realize enhanced MIMO for forming accurate beam patterns in consideration of a beam direction and a beam width or 3D beam patterns.

With the introduction of enhanced antenna systems such as the AAS, massive MIMO having a plurality of input/output antennas and a multi-dimensional antenna structure is also considered. For example, when a 2D antenna array instead of a conventional linear antenna array is formed, a 3D beam pattern can be formed using active antennas of the AAS.

Figure 10:
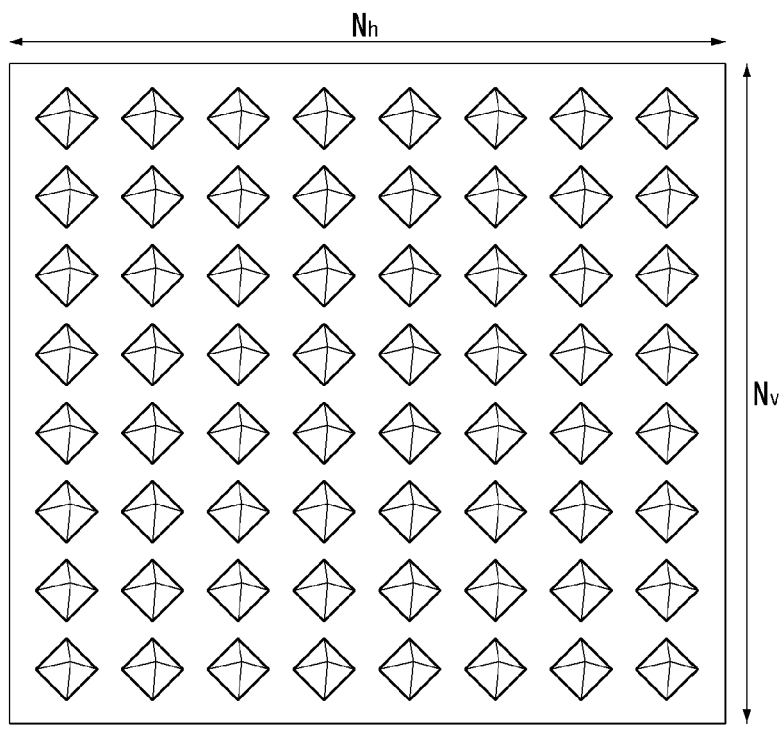
FIG. 10 illustrates a two-dimensional (2D) active antenna system having 64 antenna elements in a wireless communication system to which the present invention is applicable.

FIG. 10 illustrates a 2D AAS having 64 antenna elements in a wireless communication system to which the present invention is applicable.

FIG. 10 illustrates a normal 2D antenna array. A case in which Nt=Nv·Nh antennas are arranged in a square form, as shown in FIG. 10, may be considered. Here, Nh indicates the number of antenna columns in the horizontal direction and Nv indicates the number of antenna rows in the vertical direction.

When the aforementioned 2D antenna array is used, radio waves can be controlled in both the vertical direction (elevation) and the horizontal direction (azimuth) to control transmitted beams in a 3D space. A wavelength control mechanism of this type may be referred to as 3D beamforming.

Figure 11:
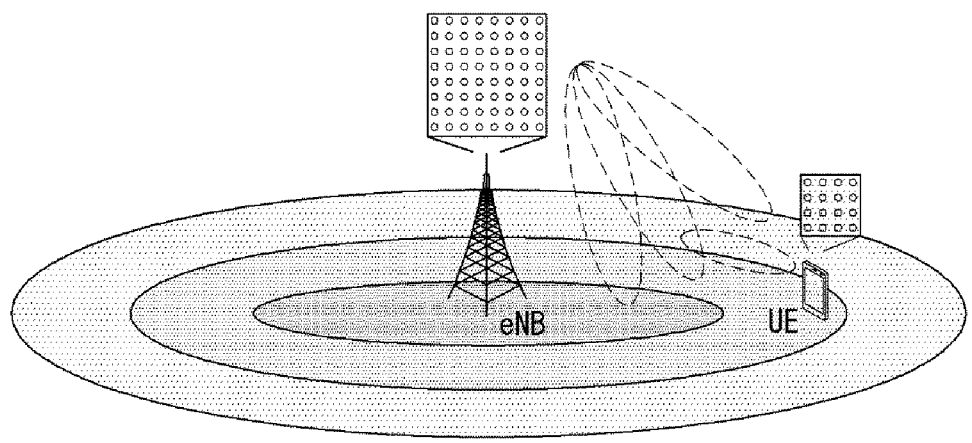
FIG. 11 illustrates a system in which a base station or a UE has a plurality of transmission/reception antennas capable of forming AAS based three-dimensional (3D) beams in a wireless communication system to which the present invention is applicable.

FIG. 11 illustrates a system in which an eNB or a UE has a plurality of transmission/reception antennas capable of forming AAS based 3D beams in a wireless communication system to which the present invention is applicable.

FIG. 11 schematizes the above-described example and illustrates a 3D MIMO system using a 2D antenna array (i.e., 2D-AAS).

From the viewpoint of transmission antennas, quasi-static or dynamic beam formation in the vertical direction as well as the horizontal direction of beams can be performed when a 3D beam pattern is used. For example, application such as sector formation in the vertical direction may be considered.

From the viewpoint of reception antennas, a signal power increase effect according to an antenna array gain can be expected when a received beam is formed using a massive reception antenna. Accordingly, in the case of uplink, an eNB can receive signals transmitted from a UE through a plurality of antennas, and the UE can set transmission power thereof to a very low level in consideration of the gain of the massive reception antenna.

Figure 12:
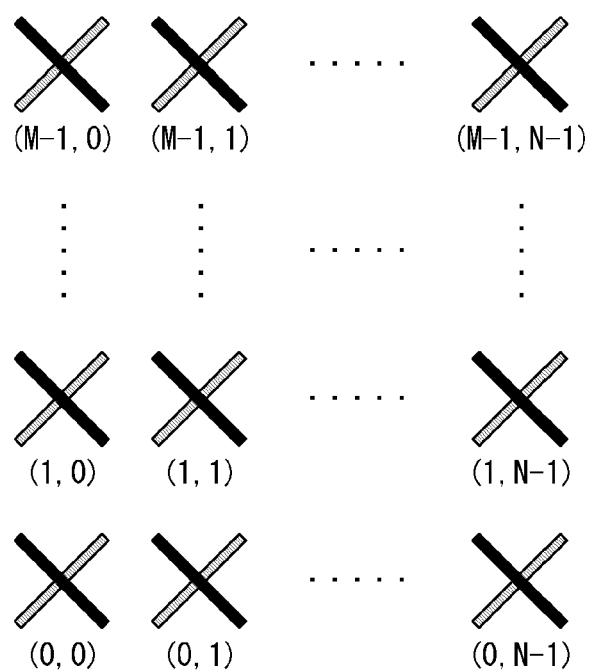
FIG. 12 illustrates a 2D antenna system having cross polarization in a wireless communication system to which the present invention is applicable.

FIG. 12 illustrates a 2D antenna system having cross polarization in a wireless communication system to which the present invention is applicable.

2D planar antenna array model considering polarization may be schematized as shown in FIG. 12.

Distinguished from conventional MIMO systems using passive antennas, systems based on active antennas can dynamically control gains of antenna elements by applying a weight to an active element (e.g., amplifier) attached to (or included in) each antenna element. Since a radiation pattern depends on antenna arrangement such as the number of antenna elements and antenna spacing, an antenna system can be modeled at an antenna element level.

The antenna arrangement model as shown in FIG. 12 may be represented by (M, N, P) which corresponds to parameters characterizing an antenna arrangement structure.

M indicates the number of antenna elements having the same polarization in each column (i.e., in the vertical direction) (i.e., the number of antenna elements having +45° slant in each column or the number of antenna elements having −45° slant in each column).

N indicates the number of columns in the horizontal direction (i.e., the number of antenna elements in the horizontal direction).

P indicates the number of dimensions of polarization. P=2 in the case of cross polarization as shown in FIG. 11, whereas P=1 in the case of co-polarization.

An antenna port may be mapped to a physical antenna element. The antenna port may be defined by a reference signal associated therewith. For example, antenna port 0 may be associated with a cell-specific reference signal (CRS) and antenna port 6 may be associated with a positioning reference signal (PRS) in the LTE system.

For example, antenna ports and physical antenna elements may be one-to-one mapped. This may correspond to a case in which a single cross-polarization antenna element is used for downlink MIMO or downlink transmit diversity. For example, antenna port 0 may be mapped to a single physical antenna element, whereas antenna port 1 may be mapped to another physical antenna element. In this case, two downlink transmissions are present in terms of a UE. One is associated with a reference signal for antenna port 0 and the other is associated with a reference signal for antenna port 1.

Alternatively, a single antenna port may be mapped to multiple physical antenna elements. This may correspond to a case in which a single antenna port is used for beamforming. Beamforming can cause downlink transmission to be directed to a specific UE by using multiple physical antenna elements. This can be accomplished using an antenna array composed of multiple columns of multiple cross-polarization antenna elements in general. In this case, a single downlink transmission derived from a single antenna port is present in terms of a UE. One is associated with a CRS for antenna port 0 and the other is associated with a CRS for antenna port 1.

That is, an antenna port represents downlink transmission in terms of a UE rather than substantial downlink transmission from a physical antenna element in an eNB.

Alternatively, a plurality of antenna ports may be used for downlink transmission and each antenna port may be multiple physical antenna ports. This may correspond to a case in which antenna arrangement is used for downlink MIMO or downlink diversity. For example, antenna port 0 may be mapped to multiple physical antenna ports and antenna port 1 may be mapped to multiple physical antenna ports. In this case, two downlink transmissions are present in terms of a UE. One is associated with a reference signal for antenna port 0 and the other is associated with a reference signal for antenna port 1.

In FD-MIMO, MIMO precoding of a data stream may be subjected to antenna port virtualization, transceiver unit (TXRU) virtualization and an antenna element pattern.

In antenna port virtualization, a stream on an antenna port is precoded on TXRU. In TXRU virtualization, a TXRU signal is precoded on an antenna element. In the antenna element pattern, a signal radiated from an antenna element may have a directional gain pattern.

In conventional transceiver modeling, static one-to-on mapping between an antenna port and TXRU is assumed and TXRU virtualization effect is integrated into a (TXRU) antenna pattern including both the effects of the TXRU virtualization and antenna element pattern.

Antenna port virtualization may be performed through a frequency-selective method. In LTE, an antenna port is defined along with a reference signal (or pilot). For example, for transmission of data precoded on an antenna port, a DMRS is transmitted in the same bandwidth as that for a data signal and both the DMRS and the data signal are precoded through the same precoder (or the same TXRU virtualization precoding). For CSI measurement, a CSI-RS is transmitted through multiple antenna ports. In CSI-RS transmission, a precoder which characterizes mapping between a CSI-RS port and TXRU may be designed as an eigen matrix such that a UE can estimate a TXRU virtualization precoding matrix for a data precoding vector.

1D TXRU virtualization and 2D TXRU virtualization are discussed as TXRU virtualization methods, which will be described below with reference to the drawings.

Figure 13A:
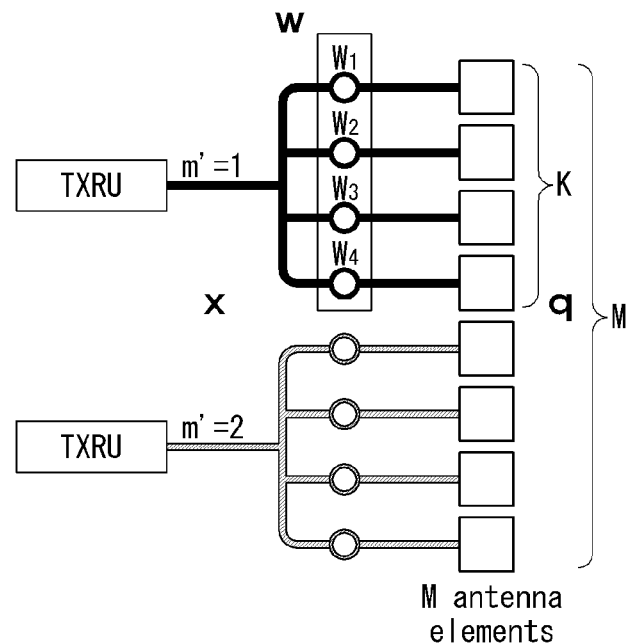
FIGS. 13A and 13B illustrate transceiver unit models in a wireless communication system to which the present invention is applicable.
Figure 13B:
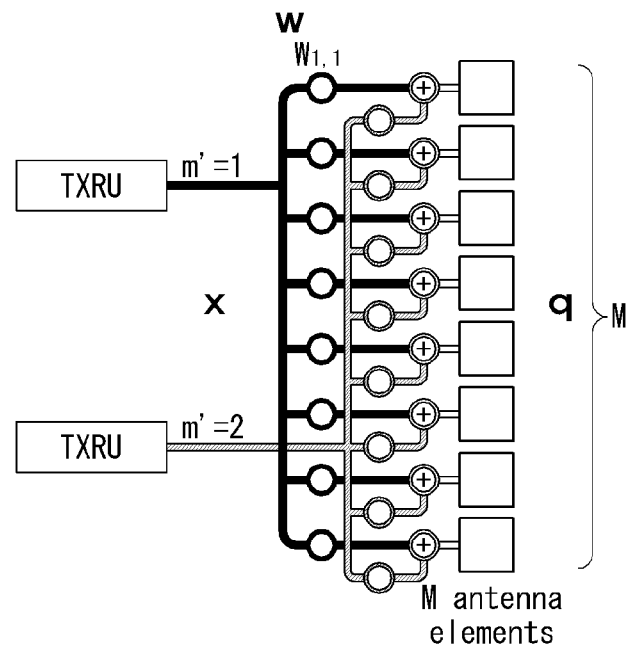

FIGS. 13A and 13B illustrate transceiver unit models in a wireless communication system to which the present invention is applicable.

In 1D TXRU virtualization, M_TXRU TXRUs are associated with M antenna elements in a single-column antenna arrangement having the same polarization.

In 2D TXRU virtualization, a TXRU model corresponding to the antenna arrangement model (M, N, P) of FIG. 12 may be represented by (M_TXRU, N, P). Here, M_TXRU denotes the number of 2D TXRUs present in the same column and the same polarization, and M_TXRU≤M all the time. That is, a total number of TXRUs is M_TXRU×N×P.

TXRU virtualization models may be divided into TXRU virtualization model option-1: sub-array partition model as shown in FIG. 12(*a*) and TXRU virtualization model option-2: full-connection model as shown in FIG. 12(*b*) according to correlation between antenna elements and TXRU.

Referring to FIG. 13A, antenna elements are partitioned into multiple antenna element groups and each TXRU is connected to one of the groups in the case of the sub-array partition model.

Referring to FIG. 13B, multiple TXRU signals are combined and delivered to a single antenna element (or antenna element array) in the case of the full-connection model.

In FIGS. 13A and 13B, q is a transmission signal vector of M co-polarized antenna elements in a single column, w is a wideband TXRU virtualization weight vector, W is a wideband TXRU virtualization weight matrix, and x is a signal vector of M_TXRU TXRUs.

Here, mapping between antenna ports and TXRUs may be 1-to-1 or 1-to-many mapping.

FIGS. 13A and 13B show an example of TXRU-to-antenna element mapping and the present invention is not limited thereto. The present invention may be equally applied to mapping between TXRUs and antenna elements realized in various manners in terms of hardware.

Definition of CSI (Channel-State Information)-Reference Signal (CSI-RS)

For a serving cell and UE configured in transmission mode 9, the UE can be configured with one CSI-RS resource configuration. For a serving cell and UE configured in transmission mode 10, the UE can be configured with one or more CSI-RS resource configuration(s). The following parameters for which the UE shall assume non-zero transmission power for CSI-RS are configured via higher layer signaling for each CSI-RS resource configuration:

CSI-RS resource configuration identifier (if the UE is configured in transmission mode 10)
Number of CSI-RS ports.
CSI RS Configuration
CSI RS subframe configuration I_(CSI-RS).
UE assumption on reference PDSCH transmitted power for CSI feedback (P_c) (if the UE is configured in transmission mode 9).
UE assumption on reference PDSCH transmitted power for CSI feedback (P_c) for each CSI process, if the UE is configured in transmission mode 10. If CSI subframe sets C_(CSI,0) and C_(CSI,1) are configured by higher layers for a CSI process, P_c is configured for each CSI subframe set of the CSI process.
Pseudo-random sequence generator parameter (n_ID)
CDM type parameter, if the UE is configured with higher layer parameter CSI-Reporting-Type, and CSI-reporting-Type is set to 'CLASS A' for a CSI process.
Higher layer parameter qcl-CRS-Info-r11 for QCL type B UE assumption of CRS antenna ports and CSI-RS antenna ports with the following parameters, if the UE is configured in transmission mode 10:
qcl-ScramblingIdentity-r11.
crs-PortsCount-r11.
mbsfn-SubframeConfigList-r11.
P_c is the assumed ratio of PDSCH EPRE to CSI-RS EPRE (Energy Per Resource Element) when UE derives CSI feedback and takes values in the range of [−8, 15] dB with 1 dB step size, where the PDSCH EPRE corresponds to the number of symbols for which the ratio of the PDSCH EPRE to the cell-specific RS EPRE.

A UE should not expect the configuration of CSI-RS and PMCH in the same subframe of a serving cell.

For frame structure type 2 serving cell and 4 CRS ports, the UE is not expected to receive a CSI RS Configuration index belonging to the set [20-31] for the normal CP case or the set [16-27] for the extended CP case.

A UE may assume the CSI-RS antenna ports of a CSI-RS resource configuration are quasi co-located (QCL) with respect to delay spread, Doppler spread, Doppler shift, average gain, and average delay.

A UE configured in transmission mode 10 and with QCL type B may assume the antenna ports 0-3 associated with qcl-CRS-Info-r11 corresponding to a CSI-RS resource configuration and antenna ports 15-22 corresponding to the CSI-RS resource configuration are quasi co-located (QCL) with respect to Doppler shift, and Doppler spread.

If a UE is configured in transmission mode 10 with higher layer parameter CSI-Reporting-Type, CSI-Reporting-Type is set to 'CLASS B', and the number of CSI-RS resources configured for a CSI process is 1 or more, and QCL type B is configured, the UE is not expected to receive CSI-RS resource configurations for the CSI process that have different values from the higher layer parameter qcl-CRS-Info-r11.

In subframes configured for CSI-RS transmission, the reference signal sequence $r_{l,n_s}(m)$ shall be mapped to complex-valued modulation symbols $a_{k,l}^{(p)}$ used as reference symbols on antenna port p. The mapping depends on the higher layer parameter CDMType.

If CDMType does not correspond to CDM4, mapping may be done according to the following Equation 14:

[Equation 14]

$$a_{k,l}^{(p')} = w_{l''} \cdot r_{l,n_s}(m')$$

$$k = k' + 12m + \begin{cases} -0 & \text{for } p' \in \{15, 16\}, \text{ normal cyclic prefix} \\ -6 & \text{for } p' \in \{17, 18\}, \text{ normal cyclic prefix} \\ -1 & \text{for } p' \in \{19, 20\}, \text{ normal cyclic prefix} \\ -7 & \text{for } p' \in \{21, 22\}, \text{ normal cyclic prefix} \\ -0 & \text{for } p' \in \{15, 16\}, \text{ extended cyclic prefix} \\ -3 & \text{for } p' \in \{17, 18\}, \text{ extended cyclic prefix} \\ -6 & \text{for } p' \in \{19, 20\}, \text{ extended cyclic prefix} \\ -9 & \text{for } p' \in \{21, 22\}, \text{ extended cyclic prefix} \end{cases}$$

$$l = l' + \begin{cases} l'' & CSI \text{ reference signal configurations } 0\text{-}19, \text{ normal cyclic prefix} \\ 2l'' & CSI \text{ reference signal configurations } 20\text{-}31, \text{ normal cyclic prefix} \\ l'' & CSI \text{ reference signal configurations } 0\text{-}27, \text{ extended cyclic prefix} \end{cases}$$

$$w_{l''} = \begin{cases} 1 & p' \in \{15, 17, 19, 21\} \\ (-1)^{l''} & p' \in \{16, 18, 20, 22\} \end{cases}$$

-continued $$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

If CDMType corresponds to CDM4, mapping may be done according to the following Equation 15.

$$a_{k,l}^{(p')} = w_{p'}(i) \cdot r_{l,n_s}(m') \quad \text{[Equation 15]}$$

$$k = k' + 12m + \begin{cases} k'' & \text{for } p' \in \{15,16,19,20\}, \\ & \text{normal cyclic prefix, } N_{ports}^{CSI} = 8 \\ k'' + 6 & \text{for } p' \in \{17,18,21,22\}, \\ & \text{normal cyclic prefix, } N_{ports}^{CSI} = 8 \\ 6k'' & \text{for } p' \in \{15,16,17,18\}, \\ & \text{normal cyclic prefix, } N_{ports}^{CSI} = 4 \end{cases}$$

$$l = l' + \begin{cases} l'' & \text{CSI reference signal configurations 0-19,} \\ & \text{normal cyclic prefix} \\ 2l'' & \text{CSI reference signal configurations 20-31,} \\ & \text{normal cyclic prefix} \end{cases}$$

$$l'' = 0,1$$

$$k'' = 0,1$$

$$i = 2k'' + l''$$

$$m = 0,1, \ldots, N_{RB}^{DL} - 1$$

$$m' = m + \left\lfloor \frac{N_{RB}^{max,DL} - N_{RB}^{DL}}{2} \right\rfloor$$

where $w_{p'}(i)$ is determined by the following Table 6. Table 6 represents the sequence $w_{p'}(i)$ for CDM4.

TABLE 6

| p' | | |
|---|---|---|
| $N_{ports}^{CSI} = 4$ | $N_{ports}^{CSI} = 8$ | $[w_{p'}(0) \; w_{p'}(1) \; w_{p'}(2) \; w_{p'}(3)]$ |
| 15 | 15, 17 | [1 1 1 1] |
| 16 | 16, 18 | [1 −1 1 −1] |
| 17 | 19, 21 | [1 1 −1 −1] |
| 18 | 20, 22 | [1 −1 −1 1] |

OFDM Numerology

As more and more communication devices demand larger communication capacity, there is a need for improved mobile broadband communication compared to existing RAT (Radio Access Technology). Also, massive MTC (Machine Type Communications), which provides various services by connecting many devices and objects, is one of the major issues to be considered in the next generation communication. In addition, a communication system design considering a service/UE sensitive to reliability and latency in the next-generation communication is being discussed. The introduction of next-generation RAT, which takes enhanced mobile broadband communication, massive MTC, and URLLC (Ultra-Reliable and Low Latency Communication) into account, is being discussed. In the present invention, this technology is referred to as new RAT for simplicity.

The new RAT system uses an OFDM transmission scheme or a similar transmission scheme. Typically, it has the OFDM numerology of the following Table 3.

TABLE 3

| Parameter | Value |
|---|---|
| Subcarrier-spacing (Δf) | 60 kHz |
| OFDM symbol length | 16.33 μs |
| Cyclic Prefix(CP) length | 1.30 μs/1.17 μss |
| System bandwidth | 80 MHz |
| (No. of available subcarriers) | 1200 |
| Subframe length | 0.25 ms |
| Number of OFDM symbols per subframe | 14 symbols |

Self-Contained Subframe Structure

In order to minimize the latency of data transmission in the TDD system in the new fifth-generation RAT, a self-contained subframe structure is considered, in which a control channel and a data channel are time-divison-multiplexed (TDM).

Figure 14:
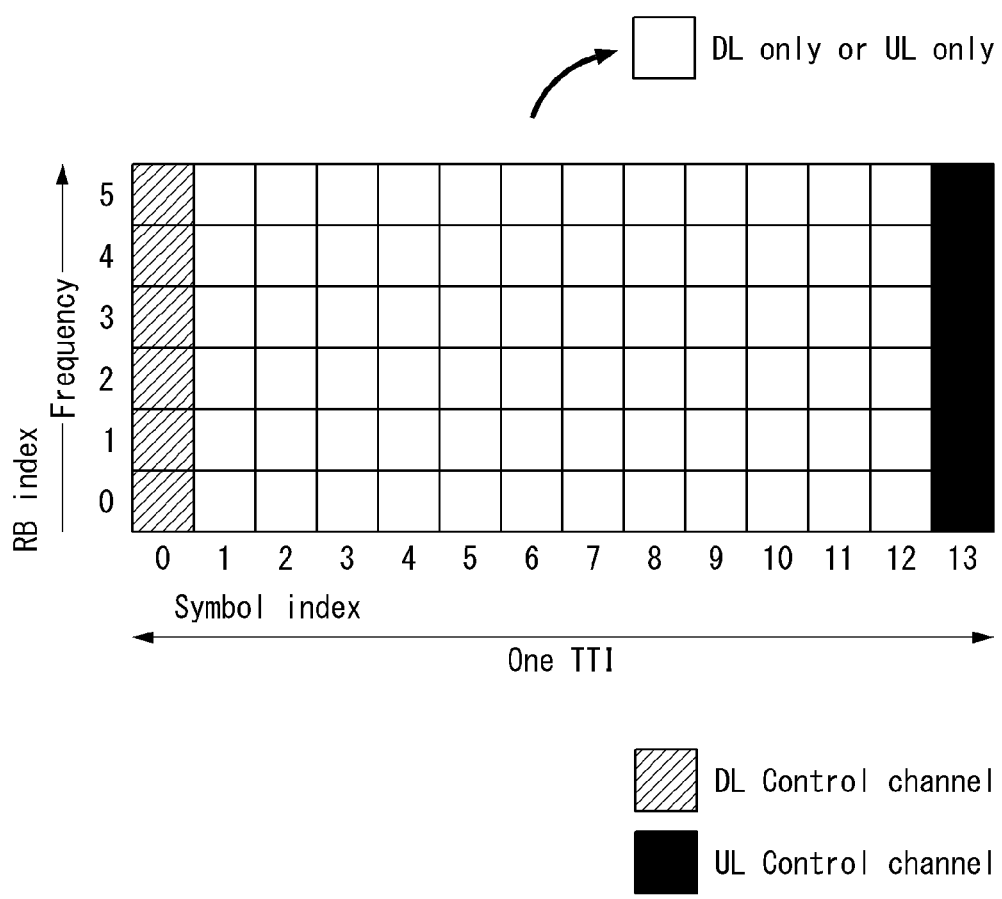
FIG. 14 illustrates a self-contained subframe structure to which the present invention is applicable.

FIG. 14 illustrates a self-contained subframe structure to which the present invention is applicable.

In FIG. 14, the hatched area represents the transmission region of a physical channel PDCCH carrying DCI, and the black area represents the transmission region of a physical channel PUCCH for carrying UCI (Uplink Control Information).

Here, the DCI is control information that the eNB transmits to the UE. The DCI may include information on cell configuration that the UE should know, DL specific information such as DL scheduling, and UL specific information such as UL grant. The UCI is control information that the UE transmits to the eNB. The UCI may include a HARQ ACK/NACK report on the DL data, a CSI report on the DL channel status, and/or a scheduling request (SR).

In FIG. 14, the area that is not hatched or black may be used for transmission of a physical channel PDSCH carrying downlink data, or may be used for transmission of a physical channel PUSCH carrying uplink data. According to the self-contained subframe structure, DL transmission and UL transmission may be sequentially performed in one subframe, whereby DL data may be transmitted and UP ACK/NACK may be received within the subframe. As a result, the time taken to retransmit data when a data transmission error occurs may be reduced, thereby minimizing the latency of final data transfer.

In the self-contained subframe structure, a time gap for switching from a transmission mode to a reception mode or vice versa is required for the eNB and the UE. To this end, some OFDM symbols at the time of switching from DL to UL in the subframe structure are set as a guard period (GP). This subframe type may be referred to as a 'self-contained SF'.

Analog Beamformin!

In millimeter wave (mmW), the wavelength is shortened, and thus a plurality of antenna elements may be installed in the same area. For example, a total of 64 (8×8) antenna elements may be installed in a 5-by-5 cm panel in a 30 GHz band with a wavelength of about 1 cm in a 2-dimensional array at intervals of 0.5λ (wavelength). Therefore, in mmW, increasing the coverage or the throughput by increasing the beamforming (BF) gain using multiple antenna elements is taken into consideration.

If a transceiver unit (TXRU) is provided for each antenna element to enable adjustment of transmit power and phase, independent beamforming is possible for each frequency resource. However, installing TXRU in all of the about 100 antenna elements is less feasible in terms of cost. Therefore, a method of mapping a plurality of antenna elements to one TXRU and adjusting the direction of a beam using an analog phase shifter is considered. This analog beamforming method may only make one beam direction in the whole band, and thus may not perform frequency selective beamforming (BF), which is disadvantageous.

Hybrid BF with B TXRUs that are fewer than Q antenna elements as an intermediate form of digital BF and analog BF may be considered. In the case of hybrid BF, the number of directions in which beams may be transmitted at the same time is limited to B or less, which depends on the method of connecting B TXRUs and Q antenna elements.

Moreover, hybrid beamforming, a combination of digital beamforming and analog beamforming, is suggested where multiple antennas are used in the new RAT system. Here, the analog beamforming (or RF beamforming) refers to performing precoding (or combining) at the RF end. In the hybrid beamforming, the baseband end and the RF end each perform precoding (or combining), which has the benefit of achieving performance close to digital beamforming while reducing the number of RF chains and the number of D (digital)/A (analog) (or A/D) converters. For convenience, the hybrid beamforming structure may be represented by N transceiver units (TXRUs) and M physical antennas. Then, digital beamforming for L data layers to be transmitted by the transmitting end may be represented by N by L matrices, and thereafter N converted digital signals are converted into analog signals through the TXRUs and then analog beamforming is applied to represent them by M by N matrices.

Figure 15:
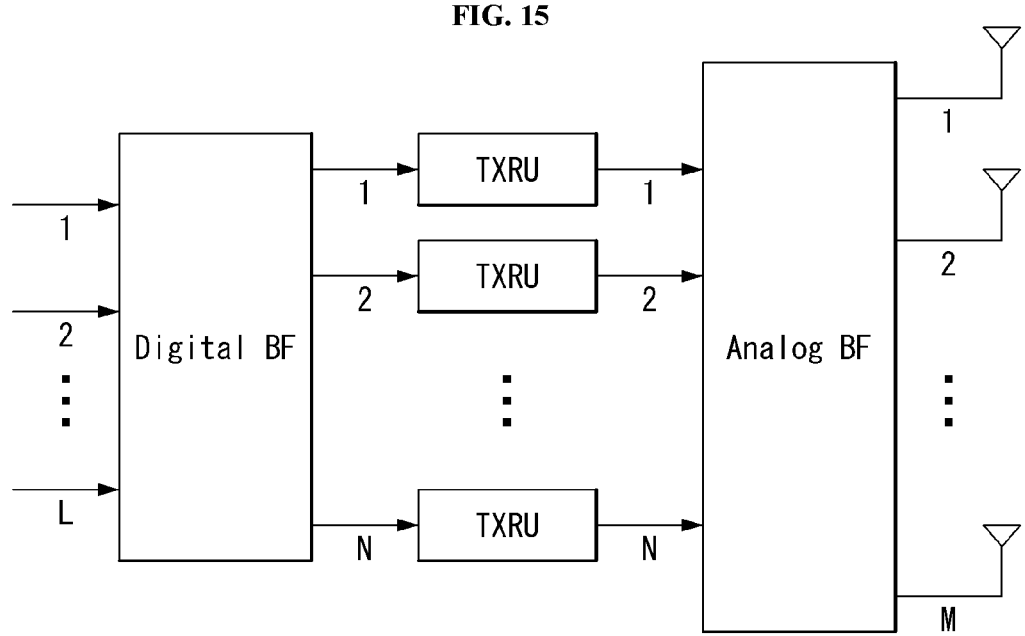
FIG. 15 is a schematic diagram of a hybrid beamforming structure from the perspective of TXRUs and physical antennas.

FIG. 15 is a schematic diagram of a hybrid beamforming structure from the perspective of TXRUs and physical antennas. In FIG. 15, the number of digital beams is L, and the number of analog beams is N.

The New RAT system is designed in such a way that the base station changes analog beamforming for each symbol, thereby supporting more efficient beamforming for a UE located in a particular area. Furthermore, in FIG. 15, when N particular TXRUs and M RF antennas are defined by a single antenna panel, the New RAT system may deploy a plurality of antenna panels to which hybrid beamforming may be applied individually.

When the base station uses multiple analog beams, each UE may require different analog beams for their signal reception. Thus, for synchronization signals, system information, and paging, beam sweeping may be taken into consideration so that the multiple analog beams to be used by the base station in a particular subframe (SF) are changed for each symbol to allow every UE to have an opportunity to receive.

Figure 16:
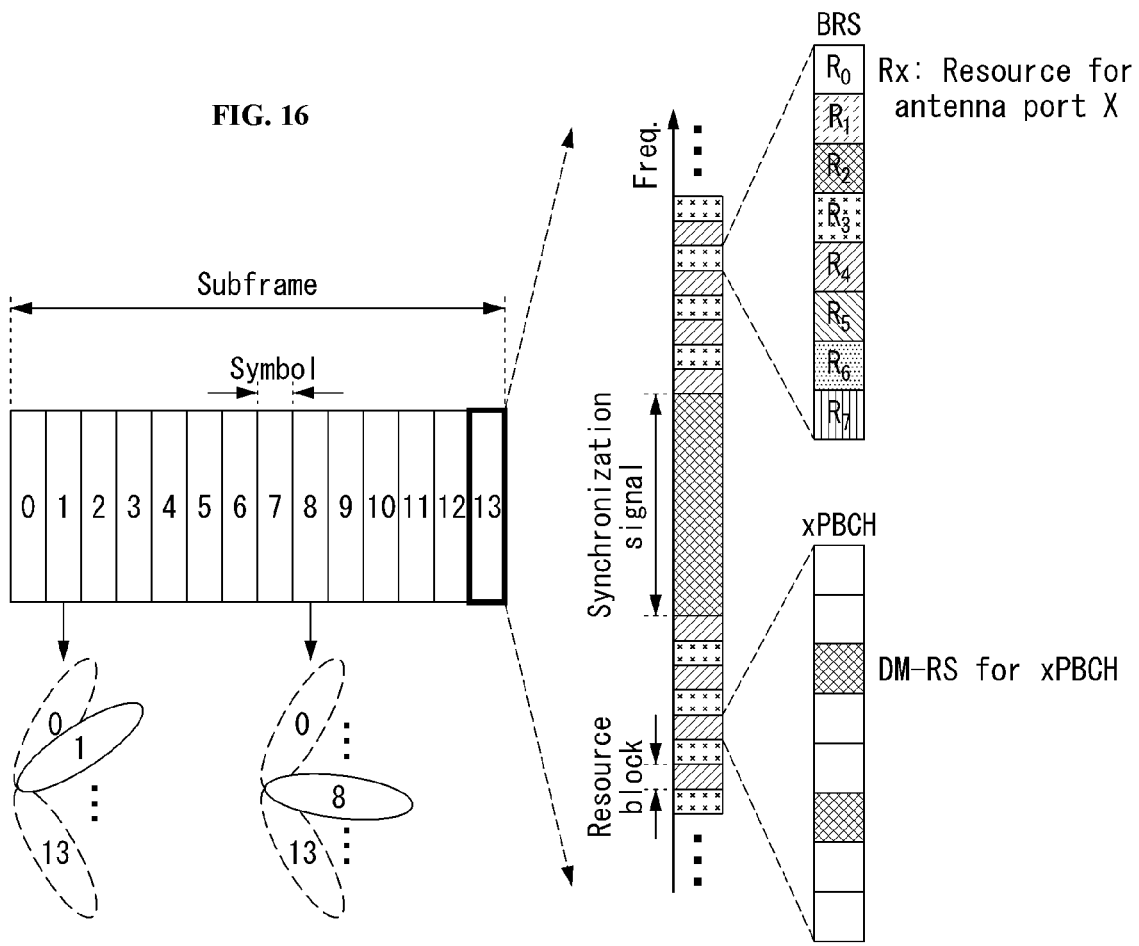
FIG. 16 is a schematic diagram of a beam sweeping operation for synchronization signals and system information in a DL transmission process.

FIG. 16 is a schematic diagram of a beam sweeping operation for synchronization signals and system information in a DL transmission process.

In FIG. 16, physical resources (or physical channels) on which the system information in the New RAT system is transmitted by broadcasting are termed xPBCH (physical broadcast channels).

Referring to FIG. 16, analog beams that belong to different antenna panels within one symbol may be simultaneously transmitted. To measure a channel for each analog beam, as shown in FIG. 16, an approach for introducing a beam RS (BRS), which is an RS that is transmitted using a single analog beam (corresponding to a specific antenna panel), is being discussed. The BRS may be defined for a plurality of antenna ports, and each antenna port of the BRS may correspond to a single analog beam. In this case, unlike the BRS, a synchronization signal or xPBCH may be transmitted using all analog beams in an analog beam group so that a certain UE may receive it properly.

RRM Measurement in LTE

LTE systems support RRM operations for power control, scheduling, cell search, cell re-selection, handover, radio link or connection monitoring, connection establish/re-establish, etc. In this case, the serving cell may request the UE for the RRM measurement information for the RRM operations. For example, the UE may measure cell search information for each cell, reference signal received power (RSRP), reference signal received quality (RSRQ), etc., and may report the measurement result. Specifically, in an LTE system, the UE may receive "measConfig" as a higher-layer signal for RRM measurement from the serving cell. In this case, the UE may measure RSRP or RSRQ according to the "measConfig" information. In this case, RSRP, RSRQ, and RSSI according to the TS 36.214 document for LTE systems can be defined as follows:

[RSRP]

Reference signal received power (RSRP) is defined as the linear average over the power contributions (in [W]) of the resource elements that carry cell-specific RSs (CRs) within the considered measurement frequency bandwidth. For RSRP determination, CRS R0 shall be used according to TS 36.211 [3]. If the UE can reliably detect that R1 is available, it may use R1 in addition to R0 to determine RSRP.

The reference point for the RSRP shall be the antenna connector of the UE.

If receiver diversity is in use by the UE, the reported value shall not be lower than the corresponding RSRP of any of the individual diversity branches.

[RSRQ]

Reference Signal Received Quality (RSRQ) is defined as the ratio N×RSRP/(E-UTRA carrier RSSI), where N is the number of RBs of the E-UTRA carrier RSSI measurement bandwidth. The measurements in the numerator and denominator shall be made over the same set of resource blocks.

E-UTRA Carrier Received Signal Strength Indicator (RSSI) comprises the linear average of the total received power (in [W]) observed/measured by the UE, only in OFDM symbols containing reference symbols for antenna port 0, in the measurement bandwidth, over N number of resource blocks from all sources (including co-channel serving and non-serving cells), channel interference, thermal noise etc. If higher-layer signaling indicates certain subframes for performing RSRQ measurements, then RSSI is measured over all OFDM symbols in the indicated subframes.

The reference point for the RSRQ shall be the antenna connector of the UE.

If receiver diversity is in use by the UE, the reported value shall not be lower than the corresponding RSRQ of any of the individual diversity branches.

[RSSI]

The received wide band power, including thermal noise and noise generated in the receiver, within the bandwidth defined by the receiver pulse shaping filter.

The reference point for the measurement shall be the antenna connector of the UE.

If receiver diversity is in use by the UE, the reported value shall not be lower than the corresponding UTRA carrier RSSI of any of the individual receive antenna branches.

In accordance with the above-mentioned definitions, the UE configured to operate in the LTE system may measure the RSRP through IE (information element)-associated with Allowed Measurement Bandwidth (AMB) transmitted in SIB3 (System Information Block Type 3) in the case of Intra-Frequency measurement, or may measure the RSRP at one bandwidth selected from among 6 RB (Resource Block), 15 RB, 25 RB, 50 RB, 75 RB, and 100 RB through allowed measurement bandwidth (AMB) transmitted in SIBS (System Information Block Type 5) in the case of Inter-frequency measurement. Alternatively, if the information element (IE) is not present, the UE configured to operate in the LTE system may measure the RSRP in a frequency bandwidth of the entire DL system as a default. In this case, if the UE receives the allowed measurement bandwidth, the UE may assume that the corresponding value is a maximum measurement bandwidth, such that the UE can freely measure the RSRP value within the corresponding value. However, if the serving cell transmits the IE defined as WB (wideband)-RSRQ and sets the allowed measurement bandwidth to SORB or higher, the UE must calculate the RSRP value regarding the entire allowed measurement bandwidth. Meanwhile, RSSI may be measured in the frequency bandwidth allocated to the receiver of the UE according to the RSSI bandwidth definition.

Figure 17:
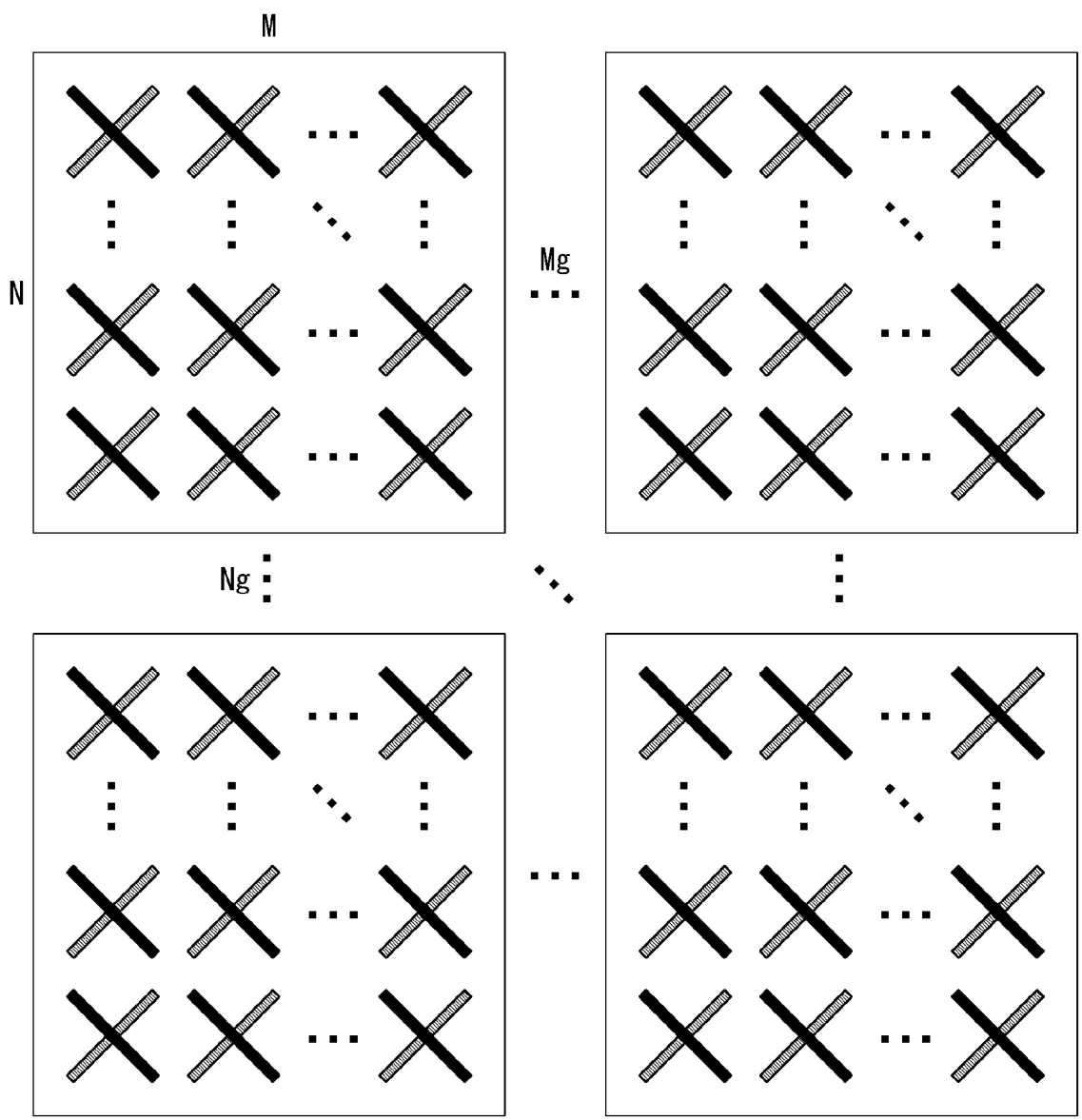
FIG. 17 illustrates a panel antenna array to which the present invention is applicable.

FIG. 17 illustrates a panel antenna array to which the present invention is applicable.

Referring to FIG. 17, the panel antenna array consists of Mg panels in the horizontal domain and Ng panels in the vertical domain, and each panel may consist of M columns and N rows. Particularly, the panels as used herein are illustrated with respect to X-pol (cross polarization) antennas. Accordingly, the total number of antenna elements in FIG. 17 may be 2*M*N*Mg*Ng.

Port Layout

Codebooks may be defined as various types. In NR (New RAT), there are mainly two types of codebooks: Type 1 codebook and Type2 codebook. Further, each type may be sub-divided depending on whether it is a codebook for a single panel or a codebook for multi-panels (e.g., Type 1 single/multi-panel codebook and Type 2 single/multi-panel codebook).

For Type 1 single panel codebook, W1 may be defined by the following Equation 16. Here, W1 denotes a first PMI having long-term, wideband, and beam selection characteristics.

$$W_1 = \begin{bmatrix} B_1 & 0 \\ 0 & B_2 \end{bmatrix}, \quad \text{[Equation 16]}$$

$$B_i = [b_0^i, \ldots, b_{L-1}^i]$$

At least for rank 1 and rank 2, the number (L) of candidate DFT (Discrete Fourier Transform) beams in B (or Bi) in W1 may be 1, 2, 4 and/or 7. The L value may be configured by the network (e.g., base station).

For L>1, L beams may be selected freely by the UE. Alternatively, at least one beam group pattern may be defined, and an example of such a beam group pattern will be described below with reference to FIGS. 18 and 19. The beam group pattern may be configured by the network (e.g., base station). A beam pattern may be reported by the UE. Alternatively, L beams may be selected freely by gNB.

Selection of L beams may apply to rank 1 and rank 2 alike or differently. For L=1, W1 may be defined by the following Equation 17:

$$W_1 = \begin{bmatrix} v & 0 \\ 0 & v \end{bmatrix} \quad \text{[Equation 17]}$$

Figure 18:
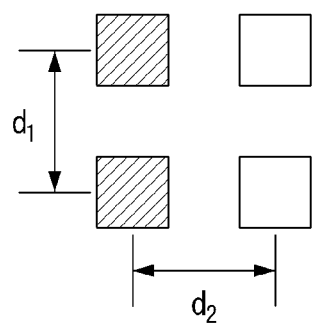
FIG. 18 illustrates candidate beam group patterns for L=2 in a 2D port layout applicable to the present invention.
Figure 18:
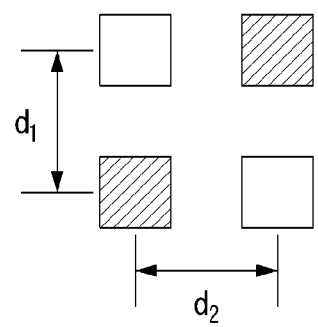
Figure 18:
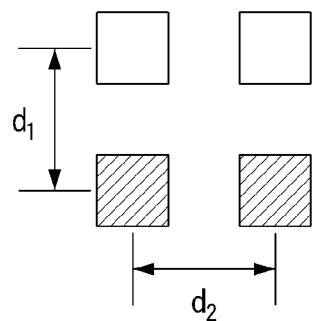
Figure 18:
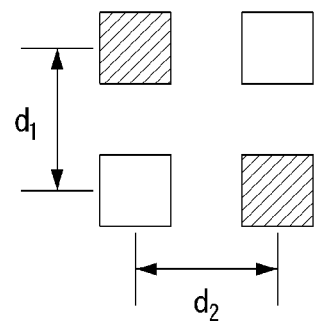

FIG. 18 illustrates candidate beam group patterns for L=2 in a 2D port layout applicable to the present invention. In this drawing, patterned squares represent L selected beams.

Figure 19:
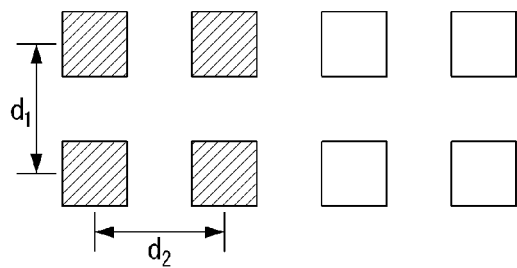
FIG. 19 illustrates candidate beam group patterns for L=4 in a 2D port layout applicable to the present invention.
Figure 19:
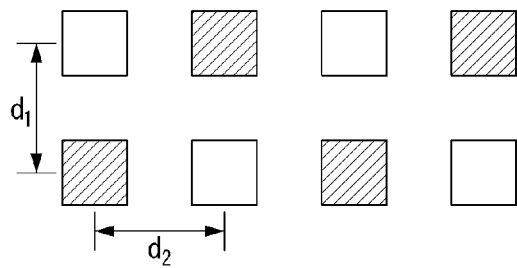
Figure 19:
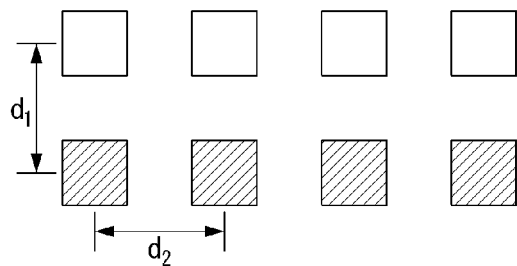
Figure 19:
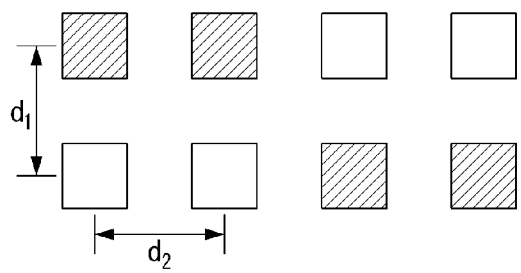

FIG. 19 illustrates candidate beam group patterns for L=4 in a 2D port layout applicable to the present invention. In this drawing, patterned squares represent L selected beams.

In a 1D port layout, a beam group pattern includes a row of beams for L>1 that are uniformly and/or non-uniformly separated by d. For L>1, a single value or multiple values may be supported for d1 and d2.

Proposal of Codebooks in NR

In wireless communication systems using panel array antennas, including New RAT, narrow beams are formed as beamforming using massive antennas is performed, and the implementation of a panel antenna array may eliminate linear increments between antenna ports. Thus, the performance of a DFT-based codebook, used in LTE, LTE-A, etc., may be degraded. Accordingly, the present invention proposes a codebook structure suitable for a panel array antenna.

Firstly, a 2D DFT beam to be applied to a 2D antenna array within one panel may be defined by Equation 18:

$$W_{m_1,m_2} = \frac{v_{m_1} \otimes u_{m_2}}{\sqrt{N_1 N_2}} \quad \text{[Equation 18]}$$

$$v_{m_1} = \left[1 \quad \exp\left(j\frac{2\pi m_1}{o_1 N_1}\right) \ldots \exp\left(j\frac{2\pi m_1 (N_1 - 1)}{o_1 N_1}\right)\right]^T$$

$$u_{m_2} = \left[1 \quad \exp\left(j\frac{2\pi m_2}{o_2 N_2}\right) \ldots \exp\left(j\frac{2\pi m_2 (N_2 - 1)}{o_2 N_2}\right)\right]^T$$

where m1 and m2 represent the indices of a 1D-DFT codebooks in first and domains, respectively, N1 and N2 represent the numbers of antenna ports per pol in first and second dimensions in a panel, and o1 and o2 represent the oversampling factors in first and second dimensions in a panel.

In FIG. 17, M and N represent antenna elements (hereinafter, M is referred to as a first domain (horizontal) parameter, and N is referred to as a second domain (vertical) parameter, for convenience of explanation). According to the results of performing antenna virtualization on a plurality of antenna elements according to a specific vector and then performing antenna element-to-port mapping, the number of ports in the first and second domains is defined by N1 and N2, respectively. When N1' and N2' are defined as the number of ports per panel, the total number (Ntot) of antenna ports to be considered in the present invention is defined as P*Mg*Ng*N1'*N2', and P may be set to 2 in the case of an X-pol antenna and 1 in the case of a co-pol antenna.

Figure 20:
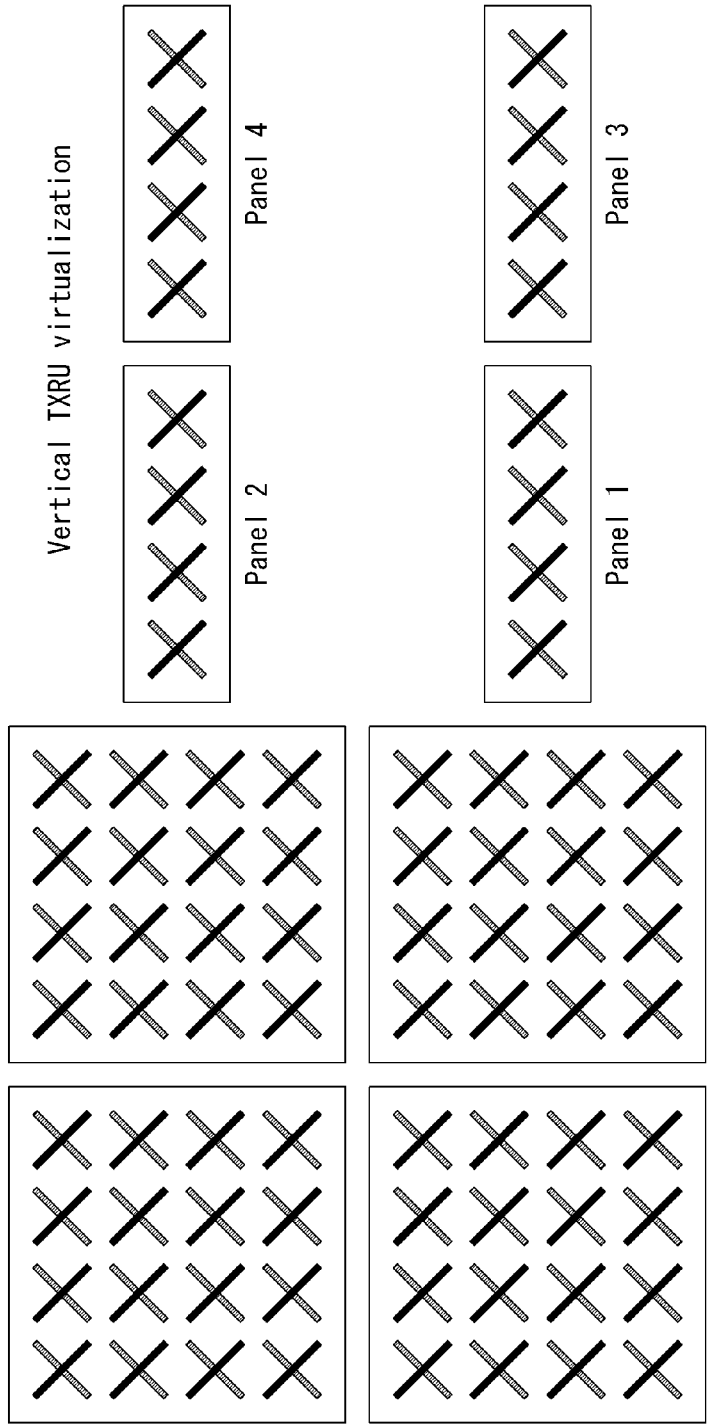
FIG. 20 is a view illustrating a non-uniform port array according to an exemplary embodiment of the present invention.

FIG. 20 is a view illustrating a non-uniform array according to an exemplary embodiment of the present invention.

Referring to FIG. 20, vertical virtualization on a panel array with 32 elements (i.e., M=4, N=2, P=2) for each panel results in P=2, N1'=4, N2'=1, Mg=2, Ng=2, which is a total of 32 ports. While antenna ports may correspond to antenna elements by antenna virtualization, the antenna ports in the present invention, after the virtualization of a single antenna element or multiple antenna elements, are generally referred to as an "antenna port" for convenience of explanation. Antenna port information for beamforming (e.g., {N1, N2, O1 and O2}, and/or {Mg, Ng, N1', N2', O1 and/or O2}) may be signaled by higher-layer signaling or agreed in advance between the UE and the network.

The Ntot value may vary, but should conform to a codebook structure that is integrally applicable to antenna ports supported in LTE systems, such as 2, 4, 8, 12, 16, 20, 24, 28, and 32-ports. To this end, the present invention considers a multi-stage codebook structure, and an example of triple stages is as shown in the following Equation 19:

$$W = W1 * W2 * W3 \qquad \text{[Equation 19]}$$

where a particular codebook matrix may be replaced with W1 (first PMI) or W2 (second PMI) in a dual-stage codebook structure used in LTE and LTE-A.

A 3GPP Rel-13 codebook follows dual structures of Rel-10 and Rel12 codebooks. That is, a final codebook is formed by multiplying W1 and W2, with W1 having the long-term, wideband, and beam group selection characteristics and W2 having the short-term, subband, and beam selection and co-phasing characteristics.

The difference with the Rel-10 and Rel-12 codebooks is that, since an antenna port layout to be considered includes two dimensions, the beams in the codebooks are described as a Kronecker product of a vertical beam and a horizontal beam. A 3GPP Rel-13 1-2 codebook may be expressed by the following Equation 20:

$$W = W_1 W_2 \qquad \text{[Equation 20]}$$

$$W^{(1)}_{m_1,m_2,n} = \frac{1}{\sqrt{2N_1N_2}} \begin{bmatrix} v_{m_1} \otimes u_{m_2} \\ \varphi_n v_{m_1} \otimes u_{m_2} \end{bmatrix},$$

$$\varphi_n = \exp\left(\frac{j2\pi n}{4}\right), n = 0, 1, 2, 3,$$

$$W^{(2)}_{m_1,m_2,n} = \frac{1}{2\sqrt{N_1N_2}} \begin{bmatrix} v_{m_1} \otimes u_{m_2} & v_{m_1} \otimes u_{m_2} \\ \varphi_n v_{m_1} & -\varphi_n v_{m_1} \otimes u_{m_2} \end{bmatrix},$$

$$\varphi_n = \exp\left(\frac{j2\pi n}{4}\right), n = 0, 1$$

$$v_{m_1} = \begin{bmatrix} 1 & \exp\left(j\frac{2\pi m_1}{o_1 N_1}\right) & \cdots & \exp\left(j\frac{2\pi m_1(N_1-1)}{o_1 N_1}\right) \end{bmatrix}^T$$

$$u_{m_2} = \begin{bmatrix} 1 & \exp\left(j\frac{2\pi m_2}{o_2 N_2}\right) & \cdots & \exp\left(j\frac{2\pi m_2(N_2-1)}{o_2 N_2}\right) \end{bmatrix}^T$$

where W^(1) represents the final form of the rank 1 codebook, and W^(2) represents the final form of the rank 2 codebook.

Here, N1 and N2 are the number of antenna ports per polarization in 1st and 2nd dimensions, and o1 and o2 are the oversampling factors in first and second dimensions.

m1 and m2 represent methods of selecting a DFT vector in horizontal and vertical (or first and second) domains. A particular W1 (i.e., first PMI) 2D beam group (i.e., Codebook Configs 1 to 4) may be created through m1 (for rank 2, m1 and m1') and m2 (for rank 2, m2 and m2'). The subscript n represents co-phasing.

That is, the 3GPP Rel-13 codebook can be viewed as a two-dimensional extension of 8Tx(8 port transfer) codebook of Rel-10 using a Kroneckerk product.

Proposal 1) Analog Codebook

This proposal proposes a method for reporting CSI information for analog beamforming using a codebook.

In an embodiment, one (e.g., W1) of the multi-stages of Equation 19 performs the function/role of codeword selection corresponding to Tx/Rx analog beamforming, or an analog codebook may be generated by a single codebook matrix.

In analog beamforming, an analog codebook may be configured by a weighting vector for TXRU virtualization. Using a 2D sub-array model in FD-MIMO, it may be configured by the following Equation 21:

$$v_{l,i} = \frac{1}{\sqrt{L}} \exp\left(-j\frac{2\pi}{\lambda}(l-1)d_H \sin\vartheta_i\right) \qquad \text{[Equation 21]}$$

$$\text{for } l = 1, \ldots, L, o = 1, \ldots, o_{1TXRU}L$$

$$w_{k,o} = \frac{1}{\sqrt{K}} \exp\left(-j\frac{2\pi}{\lambda}(k-1)d_V \cos\theta_{etilt,o}\right)$$

$$\text{for } k = 1, \ldots, K, o = 1, \ldots, o_{2TXRU}K$$

where dv and dH are the spacing between each antenna element, λ is the carrier frequency, K is the number of antenna elements in the N1 domain per TXRU, L is the number of antenna elements in the N2 domain per TXRU, O_1TXRU and O_2TXRU are the oversampling factors of 1-DFT beams formed by the elements in each domain of TXRU, the length of wo is given by K=M/N1', and the length of vi is given by L=N/N2'. $\vartheta_i$, $\theta_{etilt,o}$ are specific directivity angles in N1 and N2 domains, respectively, and may be expressed by scan and tilt angles if N1 is a horizontal domain and N2 is a vertical domain.

Accordingly, the final form of a Tx analog beam may be determined as in Equation 22:

$$W_k \otimes V_l \qquad \text{[Equation 22]}$$

Equation 22 corresponds to when antenna element indexing for virtualization is performed first in the N2 direction. If antenna element indexing for virtualization is performed first in the N2 direction, Equation 22 may be transformed into the following Equation 23:

$$V_l \otimes W_k \qquad \text{[Equation 23]}$$

An analog beam may be directed in 2D as described above, or may be directed only in 1D direction by using a vector for horizontal or vertical virtualization alone. In the present invention, exemplary embodiments will be described with respect to, but not limited to, 2D analog beams based on Equation 22 for convenience of explanation.

Each vector in Equation 21 may be expressed in the same manner by DFT beams in Equation 18 by a mathematical relationship. For example, Equation 21 may be transformed into the following Equation 24 by expressing each vector by tilting.

$$\theta_{tilt} = \cos^{-1}\left(\frac{-m_1 \lambda}{o_{2,TXRU} K d_v}\right) \qquad \text{[Equation 24]}$$

Using Equation 24, Equation 21 may be expressed by the following Equation 25:

$$v_l = \frac{1}{\sqrt{L}}\left[1 \ \exp\left(j\frac{2\pi l}{o_{1,TXRU}L}\right) \ \ldots \ \exp\left(j\frac{2\pi l(L-1)}{o_{1,TXRU}L}\right)\right]^T \quad \text{[Equation 25]}$$

$$w_k = \frac{1}{\sqrt{K}}\left[1 \ \exp\left(j\frac{2\pi k}{o_{2,TXRU}K}\right) \ \ldots \ \exp\left(j\frac{2\pi k(K-1)}{o_{2,TXRU}K}\right)\right]^T$$

where k=0, ..., o_(K−1), l=0, ..., o_(L−1). Then, the maximum size of an analog codebook may be represented by multiplying L*O_1TXRU and K*O_2TXRU. In the analog codebook, the resulting tilting angle and the scan angle may be configured by uniformly configuring all azimuth angles and zenith angles (e.g., Equation 26, and the above example assume that the zenith angle ranges from −pi to pi and the azimuth angle ranges from −pi/3 to pi/3), and by uniformly dividing the boundary of analog beams by the number of analog beams as in $\theta_1 \le \theta_{tilt} \le \theta_2$ and $\vartheta_1 \le \vartheta_{scan} \le \vartheta_2$. In this case, the base station may inform the UE of the number of analog beams used and/or the boundary value of the angle of analog beams by RRC.

$$\vartheta_{scan,1} = -\frac{\pi}{3} + \frac{2\pi}{3o_{1,TXRU}L}l(l=1, \ldots o_{1,TXRU}L), \quad \text{[Equation 26]}$$

$$\theta_{tilt,k} = \frac{\pi}{o_{2,TXRU}K}k(k=1, \ldots o_{2,TXRU}K)$$

The above-explained analog codebook for antenna virtualization may be divided into two types of codebooks:

Selection Codebook

NP (Non-Precoded) CSI-RS Based Analog Codebook

Hereinafter, the selection codebook and the NP CSI-RS based analog codebook will be proposed.

In an analog beam selection codebook, particular N_A analog beamforming beams (e.g., the N_A value may be set to L*O_1TXRU*K*O_2TXRU or set/defined to a specific value the base station informs the UE of) may be mapped to N_A CSI-RS ports (or specific ports for analog beamforming), and the UE may report a (selected) PMI using a port selection codebook.

The UE may report a number of beams pre-agreed with the base station (or indicated by the base station), including the best beam, the first and second best beams, or the best and worst beams. To this end, the base station may indicate information such as K, O_1TXRU, L, O_2TXRU, etc. or the N_A value to the UE through higher-layer signaling or may pre-agree with the UE about this. The tilting angle or scan angle mainly used for the UE may be limited depending on the UE's channel environment. Thus, to reduce the overhead of analog beam sweeping, the base station may inform the UE of the number of analog beams used for beam sweeping and/or the number of analog beams to be reported by higher-layer signaling or pre-agree with the UE about this.

When the selection codebook is used, a single analog beam is mapped to a single antenna port and transmitted, and the UE configures a selection vector by the codebook and report it to the base station. That is, in this case, the codebook is configured by an analog beam selection vector, and the codeword is as shown in Equation 27, and the UE reports the i index of Equation 27 to the base station.

$$e_i = [0, \underset{i}{\ldots 1}, \ldots, 0]^T, \text{where } i = 1, \ldots, N_A \quad \text{[Equation 27]}$$

Using Equation 27, the best Tx analog beam reporting codebook may be expressed as in Equation 28:

$$W_{analog,Tx,i} = [e_i] \in \mathbb{C}^{N_A \times 1} \quad \text{[Equation 28]}$$

In this case, the number of feedback bits in the codebook is $\lceil \log_2 N_A \rceil$. For example, for N_A=32, a total of 5 bits of a feedback payload is required.

When the UE additionally reports the best beam or the worst beam, the UE may be newly defined and used as an indicator indicating the number of beams to be reported, or an RI in an LTE system may be newly defined and used as an indicator indicating the number of beams. For example, when the first beam is selected as the best beam and the fourth beam is selected as the worst beam, the UE may report, to the base station, RI=2 and a PMI index corresponding to $W_{analog,Tx}^2 = [e_1, e_4] \in \mathbb{C}^{N_A \times 2}$, obtained by applying the first beam and the fourth beam to Equation 28. And/or, the UE may assume a rank 1 restriction on each beam and report a PMI with a different period and/or offset. In this case, the number of feedback bits to be reported is $\lceil \log_2(N_A(N_A-1)) \rceil$. And/or, the UE may use the codebook for the purpose of indicating the range of a TX analog beam (e.g., for the purpose of indicating $\theta_1$ and $\theta_2$ in $\theta_1 \le \theta_{tilt} \le \theta_2$).

While this embodiment has been exemplified with respect to vertical tilting/domain, the present invention is not limited thereto and this codebook may be used for the purpose of indicating horizontal tilting/domain or 2-D tilting/domains where both horizontal and vertical tilting/domains are used. Moreover, in this embodiment, the UE may be understood/interpreted as providing the base station with information on an analog codebook subset restriction, and this may be applicable to digital codebooks.

In analog beam sweeping, the payload size may not be a big problem because of the long term and wideband characteristics. Thus, when the analog beam selection codebook is used, analog beams may be fed back in a linear combination as shown in Equation 29 may be considered for more precise feedback.

$$\frac{1}{\left\|\sum_{i \in S_l} c_i e_i\right\|} \sum_{i \in S_l} c_i e_i \quad \text{[Equation 29]}$$

where $S_l$ is a set of l-th beams participating in beam combining, and ci is a combination coefficient which may have a particular complex value and be configured by $c_{i,j,k} = a_{i,j} \exp(j\phi_{i,k})$. At least some of the elements of $S_l$, $a_{i,j}$, $\phi_{i,k}$ may be pre-agreed between the base station and the UE, and the base station may indicate them to the UE by RRC. For example, if the total number of analog beams used for Tx beam sweeping is 4 and the number of beams participating in combining is 2, $S_l \in \{(1,2), (1,3), (1,4), (2,3), (2,4), (3,4)\}$, $a_{i,j} = \{1, 0.5, 0.25, 0\}$, $\phi_{i,k} = \{1, j, -1, -j\}$ may be established. In the above example, the number of required feedback bits is 3+2+2=7, and at least some of the feedback elements/content may be joint-encoded and fed back/reported. And/or, each element/content may be fed back with a different period and/or different feedback granularity/unit (e.g., Wideband (WB)/Subband (SB)). A combining codebook, in comparison with a codebook only using a selection through Equation 27, has the advantage of being capable of implementing an analog codebook with a relatively higher granularity.

If the UE is located in an environment with a lot of interference (e.g., at a cell boundary), performance degradation may get severe due to interference from an analog beam transmitted from an interfering TRP (Transmission Reception Point). In this case, the UE may measure the interference by the codebook and report to the base station information (e.g., {0.5,0.25,0.125,0}*P, where P is transmitted power) on the reduced power level due to the interference, along with/simultaneously with the corresponding codeword.

The foregoing embodiment has been described with respect to a Tx beam sweeping operation of the base station. However, if the UE performs Rx beam sweeping, the UE may report information about this to the base station to let the base station know the UE's UL beamforming information. That is, similarly to Equation 25, an Rx analog beam may be represented by Equation 30:

$$r_a = \frac{1}{\sqrt{A}}\left[1 \ \exp\left(j\frac{2\pi a}{o_{1r,TXRU}A}\right) \ldots \exp\left(j\frac{2\pi a(A-1)}{o_{o_{1r,TXRU}}A}\right)\right]^T, \quad \text{[Equation 30]}$$
$$a = 0, \ldots, o_{1r,TXRU}A - 1$$
$$s_b = \frac{1}{\sqrt{B}}\left[1 \ \exp\left(j\frac{2\pi b}{o_{2r,TXRU}B}\right) \ldots \exp\left(j\frac{2\pi b(B-1)}{o_{o_{2r,TXRU}}B}\right)\right]^T,$$
$$b = 0, \ldots, o_{2r,TXRU}B - 1$$

where A and B represent the numbers of antenna elements in first and second domains of the UE's TXRU, and $o_{1r,TXRU}$ and $o_{2r,TXRU}$ represent the oversampling factors in first and second domains of an analog DFT codebook.

The final 2D (or 1D) DFT beam may be expressed as a Kronecker product $r_a \otimes s_b$ or $S_b \otimes r_a$ using Equation 30, as in Equation 22.

For configuring a UL codebook, the UE may additionally give feedback to the base station about information of A, B, $o_{1r,TXRU}$, and $o_{2r,TXRU}$ or the number of Rx beamforming. And/or, the UE may additionally give feedback to the base station about the port index direction (that is, $r_a \otimes s_b$ or $s_b \otimes r_a$) or pre-agree with the base station about it. The entire size (Nrx,tot) of the Rx analog beamforming codebook may be 'A*B*$o_{1r,TXRU}$*$o_{2r,TXRU}$', and the UE's Rx beamforming selection codebook may be represented by Equation 31:

$$W_{analog,Rx,j} = [e_j] \in C^{N_A,RX \times 1} \quad \text{[Equation 31]}$$

where N_(A,RX) represents the number of Rx beamforming.

Among all the analog codebooks of $W_{analog,Tx} \otimes W_{analog,Rx}$, Tx-Rx beam pair codebooks, for example, may be reported collectively or independently, and may have different feedback periods, offsets, and/or feedback granularities/units (e.g., wideband/subband/partial-band). Alternatively, RI may be used in order for the UE to indicate Rx beamforming. For example, if RI=2 is reported, the base station may recognize that Rx beamforming is reported (along with Tx beamforming), and may calculate each Tx-Rx beamforming by the codebooks of $W_{analog,Tx} \otimes W_{analog,Rx}$.

In the above-described analog beamforming selection codebook, complexity increases linearly according to the number of analog beamformed ports. That is, for N_A=128, the number of CSI-RS ports required for one resource is 128, and it may be inefficient to transmit all these many ports in each PRB pair. Accordingly, CSI-Rs Comb-type transmission may be taken into consideration, in which all analog beamformed CSI-RS ports are divided into N sub-port groups and the N sub-port groups are mapped one-to-one to N PRB pairs so that the N sub-port groups are transmitted to every N PRB pairs (i.e., CSI-RS ports required for one resource are divided and transmitted across N PRB pairs). For example, for N_A=128 and N=4, ports corresponding to 0th to 31th beams may be transmitted in 0, 4, 8, . . . PRB-pairs (i.e., 4n PRB-pairs (n=0,1,2 . . . )), ports corresponding to 32th to 63th beams may be transmitted in 1, 5, 9, . . . PRB-pairs (i.e., 4n+1 PRB-pairs (n=0,1,2 . . . )), ports corresponding to 64th to 95th beams may be transmitted in 2, 6, 10, . . . PRB-pairs (i.e., 4n+2 PRB-pairs (n=0,1,2 . . . )), and ports corresponding to 96th 127th beams may be transmitted in 3, 7, 11, . . . PRB-pairs (i.e., 4n+3 PRB-pairs (n=0,1,2 . . . )). Alternatively, ports (32 ports in the above example) corresponding/included in each sub-port group may be transmitted with different time offsets and/or periods for each sub-port group (and/or for each port in each sub-port group).

To reduce overhead in terms of the UE's reporting, port selection may be performed by using RI for the purpose of indicating the above-mentioned time offset and/or frequency offset. For example, if the best analog beam is the 64th beam in the above example, the UE may report RI=3 and PMI=1 ($W_{analog,Tx,1} = [e_1] \in C^{32 \times 1}$) to the base station.

The above-described selection-based codebook may be used solely for the purpose of beam management, and may have a higher priority level than other CSIs (e.g., i1(first PMI), i2(second PMI), RI, CQI and/or CRI). Also, if the beam gain is lower than or equal to a particular threshold, the UE may trigger CSI-RS port transmission for the selection codebook or report a beam index (e.g., the second best beam index) different from the beam index reported immediately before reference resource reception.

Hereinafter, an NP CSI-RS based analog codebook will be described.

In beam sweeping, as the number of beams increases (i.e., as K, L, o1, and o2 increase), a larger number of OFDM symbols used for beam sweeping and/or more CSI-RS ports are required and the complexity of calculation by the UE increases much. If the total number of antenna elements or K*L is equal to the number of CSI-RSs supported in NR, the UE may measure channels and report the best analog beam and/or digital beam by using NP CSI-RS (i.e., through 1:1 element-to-port mapping).

In an example, Equation 32 may be configured as a final codebook by using Equation 19. In this case, when the UE reports an analog codebook, the analog codebook may be reported based on a multi-stage codebook (e.g., triple-stages as in Equation 32), and the analog codebook may be used as one component of the multi-stage codebook.

$$W = W_a W_1 W_2 = \underbrace{\begin{bmatrix} W_{a1} & 0 & 0 \\ 0 & \ddots & 0 \\ 0 & 0 & W_{a,N_{ports}} \end{bmatrix}}_{\text{Analog codebook}} \underbrace{W_1 W_2}_{\text{Digital dual stage codebook}} \quad \text{[Equation 32]}$$

Analog codebooks ($W_{ai} \in C^{N_A \times 1}$ (i=1, . . . , $N_{ports}$, where $N_{ports}$ is the number of digital ports)) positioned in the diagonal term of the first matrix of Equation 32 may be configured by Equation 22 or 23, and W1 and W2 may be an LTE codebook or a digital codebook to be described later. Moreover, for $W_{a1}= \ldots =W_{a1N_{ports}}$, the same analog beam is applied to all digital ports, in which case the UE may only give feedback/report of the PMI of a representative analog beam for all the ports. However, it should be noted that, for more precise CSI feedback, the UE may perform feedback/report assuming $W_{a1} \neq \ldots \neq W_{a1N_{ports}}$ using different analog beams for every port. In this case, there may be a disadvantage that the number of feedback bits increases by N_ports, as compared to using the same analog beam for every port. However, PMI (i.e., Wa) feedback on analog beams has a very long term characteristic (e.g., an integer multiple of digital W1 or RI), and the overhead increase may not be that large from the entire system perspective.

Accordingly, for efficient use of the codebook, the base station may transmit NP CSI-RS in K*L ports in the first CSI-RS resource according to the UE's analog codebook feedback period, assuming that the same analog beam applies to every port. In this case, the UE may report the best analog beam index to the base station, and, with this, the base station may transmit, to the UE, N_ports CSI-RS using analog beamforming (corresponding to the analog beam index reported by the UE) for the second CSI-RS resource. The UE may give report/feedback (i.e., digital codebook feedback) to the base station about the RI, PMI and/or CQI for/corresponding to N_ports. The aforementioned two resources (i.e., the first and second CSI-RS resources) may have different periods and/or offsets. If collision occurs between the two resources, the resource for analog beamforming (i.e., the resource for determining an analog beam; the first CSI-RS resource in the above example) has a higher priority level.

Alternatively, to apply a codebook with high granularity, the base station may transmit CSI-RS using K*L*N_ports NP CSI-RS ports in one resource, and the UE may report the best PMI, CQI and/or RI to the base station based on the CSI-RS.

Proposal 2) Digital Codebook

In the New RAT, LTE codebooks or class A codebook may be re-used. Such codebooks have a dual-stage structure, and examples of this structure include Rel-10 8Tx, Rel-12 4Tx, Rel-13 12Tx, 16Tx, Rel-14 20-, 24-, 28-, and 32Tx codebooks. In the dual-stage structure (i.e., W=W1*W2), W1 serves to determine a specific number of beam groups with the long-term/wideband characteristics, and W2 serves to select beams within a beam group with the short-term/subband characteristics, determined as W1, and perform co-phasing under an X-pol antenna situation.

Preferably, codebooks used in the New RAT are configured within one framework, and it is expected that configuring a codebook with configuration information such as parameters N1 and N2 for configuring a TX port and o1 and o2 for configuring a codebook will make it easy to maintain scalability and implement the UE.

In an LTE 2-port codebook, rank 1 is configured by QPSK (quadrature phase-shift keying) (indices 0,1,2, and 3 of Table 4), and rank 2 is configured by QPSK (indices 0,1, and 2 of Table 4). However, if analog beams are applied to ports to make the beams sharper, it may be better to increase beam granularity in terms of performance.

Accordingly, the present invention proposes to configure a 2-port codebook of rank 1 and rank 2 using 8-PSK for co-phasing, as in Table 4, in order to increase 2-port granularity.

TABLE 4

| Codebook index | Number of layers $\upsilon$ | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | $\frac{1}{2\sqrt{2}}\begin{bmatrix}\sqrt{2} & \sqrt{2}\\1+j & -1-j\end{bmatrix}$ |
| 4 | $\frac{1}{2}\begin{bmatrix}\sqrt{2}\\1+j\end{bmatrix}$ | $\frac{1}{2\sqrt{2}}\begin{bmatrix}\sqrt{2} & \sqrt{2}\\1-j & -1+j\end{bmatrix}$ |
| 5 | $\frac{1}{2}\begin{bmatrix}\sqrt{2}\\1-j\end{bmatrix}$ | — |
| 6 | $\frac{1}{2}\begin{bmatrix}\sqrt{2}\\-1+j\end{bmatrix}$ | — |
| 7 | $\frac{1}{2}\begin{bmatrix}\sqrt{2}\\-1-j\end{bmatrix}$ | — |

And/or, the base station may configure a codebook bit field for the UE to set whether the final codebook is QPSK or 8-PSK. For example, if the UE is given a 2-bit field from the base station, the UE may use the codebooks of the indices 0 to 3 in Table 4, and if the UE is given a 3-bit field from the base station, the UE may use the codebooks of the indices 0 to 7 in Table 4. This may be used for a purpose similar to a codebook subset restriction. While the existing codebook subset restriction cannot reduce feedback bits, the above proposed method may reduce feedback bits to thereby reduce uplink overhead.

In another embodiment, if different analog beamforming is performed for each port and there are many antenna elements for virtualization that constitute a single analog beam to form very sharp beams, the codebook performance improvement caused by digital codebook application is expected to be not very high. In this case, it may be more efficient to apply different beams to two ports and select only a particular port. In this case, a 2-port codebook configuration may be proposed as in Table 5.

TABLE 5

| Codebook index | Number of layers $\upsilon$ | |
|---|---|---|
| | 1 | 2 |
| 0 | $\begin{bmatrix}1\\0\end{bmatrix}$ | $\frac{1}{\sqrt{2}}\begin{bmatrix}1 & 0\\0 & 1\end{bmatrix}$ |
| 1 | $\begin{bmatrix}0\\1\end{bmatrix}$ | |

In the proposal according to Table 5, no PMI feedback (i.e., beam selection) is required for rank 2.

In another embodiment, a codebook having codewords with different magnitudes for different ports may be configured, and an example of this is as shown in Equation 33:

$$\frac{1}{\sqrt{1+a^2}}\begin{bmatrix} 1 \\ \alpha\phi_n \end{bmatrix} \text{ for Rank 1} \qquad \text{[Equation 33]}$$

$$\frac{1}{\sqrt{2+2a^2}}\begin{bmatrix} 1 & a \\ a\phi_n & -\phi_n \end{bmatrix} \text{ for Rank 2}$$

As exemplified in Equation 33, in a 2-port codebook, a port may have a particular magnitude that is equal to or smaller than that of another port. For example, in Equation 33, $\alpha=\{1,0.5,0.25,0\}$ If $\alpha$ is 1, the codebook has the characteristics of the codebook exemplified in Table 4, and if $\alpha$ is 0, the codebook is similar to the port selection codebook exemplified in Table 5. $\alpha$ may be applied for each wideband or partial-band, and the reporting period is long-term. In Equation 33, $\phi_n$=exp(−j2πn/4) for n=0, 1, 2, 3, $\phi_n$= exp(−j2πn/8) for n=0, 1, . . . , 7 corresponding to the phase may be set to QPSK or 8-PSK according to the range of the n value.

Accordingly, the base station may inform the UE of specific information corresponding to the a value and/or $\phi_n$ co-phasing size by RRC or pre-agree with the UE. Alternatively, the base station may signal/configure bit fields for the amplitude and co-phase of the codebook for the UE individually or integrally and set them for the UE. For example, if the bit field size of the amplitude is set to 1 bit, $\alpha=\{1,0.5\}$ or $\alpha=\{1,0\}$, and the base station may set the co-phase bit field size to 2 bits and inform the UE of information on co-phasing based on QPSK.

The above-explained codebook may assume X-pol and be more suitable when the same analog beam is configured/applied for each port. On the other hand, if different analog beams are configured/applied for each port, it may be ambiguous to know which port is given a better beam gain due to the differences in beam gain. Thus, a codebook having such a structure as in Equation 34, which is a more generalized form of the proposed codebook, may be suggested. According to this codebook, the power amplitude codebook of each port may be configured independently, thereby improving performance gain.

$$\frac{1}{\sqrt{\alpha^2+\beta^2}}\begin{bmatrix} \alpha \\ \beta\phi_n \end{bmatrix} \text{ for Rank 1} \qquad \text{[Equation 34]}$$

$$\frac{1}{\sqrt{2(\alpha^2+\beta^2)}}\begin{bmatrix} \alpha & \beta \\ \beta\phi_n & -\alpha\phi_n \end{bmatrix} \text{ for Rank 2}$$

In the codebook according to Equation 34, the values of parameters $(\alpha,\beta,\phi_n)$ (and/or each parameter set and/or set size) may be set by RRC or pre-agreed between the base station and the UE. Alternatively, when the UE reports a port index with a relatively high gain in 1 bit to the base station to reduce the feedback bits of a $\alpha,\beta$, the base station may set the amplitude coefficient of the corresponding reported port to '1'. In this case, the UE reports only the amplitude coefficient information of the other one port to the base station, and as a result, the feedback bits are reduced. For example, in a case where the UE gives feedback/report of a port index with a high gain as the second port, $\beta=1$ is determined/set, and $\alpha$ may be determined/set to a value the UE reports to the base station, within an amplitude set (e.g., $\alpha=\{1, 0.5, 0.25, 0\}$) pre-agreed between the base station and the UE.

To apply the aforementioned 2-port codebooks to a unified framework of the dual-stage structure, W1 (matrix) may be assumed as a square matrix (I), and the codebooks of Table 4 or Table 5 may be applied as W2 (matrix) (i.e., W=W1*W2=I*W2). In another method, the aforementioned analog beam selection codebooks may be used for W1, and W2 may be configured as in Table 4 and Table 5 so that codebooks are defined/applied in the form of W=W1*W2=Wa*W2. For Wa, the aforementioned Tx analog codebook configuration may be used. In another method, Wa may be N_(a,Tx) analog beam selection codebooks. For example, for N_(a,Tx)=4, selection codebooks of Wa may be configured/defined as $(e_i, e_j) \in \{(i,j)|(1, 1),(2, 2),(3, 3),(4, 4), (1,2),(1,3),(1,4), (2,3), (2,4),(3,4)\}$, or a set of some of them to adjust to the payload size for example, $(e_i,e_j) \in \{(i,j)|(1,1), (2, 2),(3, 3), (4,4),(1,2),(1,4), (2,3), (2,4)\}$, a beam selection combination of LTE-A rank 2 codebooks. Alternatively, for N_(a,Tx)=4, selection codebooks of Wa may be specialized for Table 5 and configured/defined/transmitted by using different beams for different ports (in the above example, $(e_i,e_j) \in \{(i,j)|(1,2),(1,3),(1,4),(2,3),(2,4),(3,4)\}$).

In another method for configuring a 2-port codebook, W2 in W=Wa*W2 may be configured by a linear combining codebook. For example, W2 may be configured as in $$\frac{1}{\sqrt{|c_2|^2+|c_2|^2}}\left(\begin{bmatrix} c_1 \\ 0 \end{bmatrix}+\begin{bmatrix} 0 \\ c_2 \end{bmatrix}\right),$$

and c1 and c2 have a complex value.

The base station may configure which of the aforementioned codebooks the UE will use/apply by RRC.

Proposal 3) Panel-Based Codebook

One of the new characteristics of the New RAT is to support a multi-panel antenna array consisting of multiple antennas as shown in FIG. 20. In this case, as shown in FIG. 20, unless the spacing between panels is set in such a manner that the spacing between all antenna elements is constant, the characteristics (i.e., uniform increments) of DFT codebooks which the existing LTE is based on, are not met, thereby leading to performance degradation.

To solve this, the present invention proposes a method (proposal 3-1) that performs compensation between each panel and/or a method (proposal 3-2) that selects a specific panel(s) and configures a digital codebook.

3-1) Compensation Between Panels

For convenience of explanation, this embodiment will be described with reference to FIG. 20.

In FIG. 20, ports may be configured for each panel by 4-element vertical antenna virtualization, with each panel (panels 1 through 4) including 8 ports, and therefore a total of 32 digital ports are configured. 32 ports are supported in eFD-MIMO, and class A codebooks may be used. In this case, the final codebook may be as in Equation 35:

$$W = W_c W_1 W_2 = \underbrace{\begin{bmatrix} \tilde{W}_c & 0 \\ 0 & \tilde{W}_c \end{bmatrix}}_{W_c} \underbrace{\begin{bmatrix} \tilde{W}_1 & 0 \\ 0 & \tilde{W}_1 \end{bmatrix}}_{W_1} \underbrace{\begin{bmatrix} e_{i2} \\ \phi_n e_{i2} \end{bmatrix}}_{W_2} \qquad \text{[Equation 35]}$$

where $\tilde{W}_c \in C^{N_1 N_2}$ is a diagonal matrix and serves to perform codebook compensation control (i.e., compensation matrix/codebook), $w_1 \in C^{2N_1N_2 \times 2N_W}1$ W1 of a dual-stage codebook in a LTE system, N_W1 corresponds to the number of beam groups of W1, and $W_2 \in C^{2W_1 \times rank}$ is W2 of the dual-stage codebook in the LTE system and serves to perform beam selection and co-phasing.

Referring to FIG. 20, assuming that (N1'=4, N2'=1) N2 direction is a vertical direction, We may be configured as in Equation 36:

$$\hat{W}_r = \begin{bmatrix} \tilde{W}_{1r} & 0 \\ 0 & \tilde{W}_{2r} \end{bmatrix}, \tilde{W}_{1r} = \begin{bmatrix} 1 & & & & & & & \\ & \alpha & & & & & & \\ & & 1 & & & & & \\ & & & \alpha & & & & \\ & & & & 1 & & & \\ & & & & & \alpha & & \\ & & & & & & 1 & \\ & & & & & & & \alpha \end{bmatrix}, \quad \text{[Equation 36]}$$

$$\tilde{W}_{2r} = \begin{bmatrix} \beta & & & & & & & \\ & \gamma & & & & & & \\ & & \beta & & & & & \\ & & & \gamma & & & & \\ & & & & \beta & & & \\ & & & & & \gamma & & \\ & & & & & & \beta & \\ & & & & & & & \gamma \end{bmatrix}$$

where α, β, γ refer to compensation terms/compensators/correctors (hereinafter, 'correctors') of panels 2, 3, and 4 (with respect to panel 1)—for example, they may have a particular complex value such as QPSK{1,−1, j,−j} (and/or BPSK (binary phase-shift keying)). These correctors may be used to compensate for the phase and/or amplitude between panels, and the UE may signal the correctors (e.g., α, β, γ) and give report/feedback to the base station by CSI (e.g., PMI in CSI). In this case, the UE may give report/feedback indicating that a corrector is WB (Wideband) and/or SB (Subband) according to the RRC mode setting (e.g., modes 1 and 2) by the base station (that is, the UE reports to the base station about a corrector (hereinafter, described as "WB and/or SB panel corrector') selected/derived/acquired for Wideband and/or Subband according to the mode setting).

If γ can be expressed by a function of α and β due to the characteristics of a linear planar array (for example, γ=α*β), the UE may not give feedback on γ and therefore the feedback overhead is reduced.

The above concept may be expanded to designate one representative panel corrector value for each domain. In the above example, α may be designated as a vertical panel reference corrector, and β may be designated as a horizontal panel reference corrector, and the correctors for the other panels may be expressed by a function of α and/or β. For example, if panel 5 exists at the right side of panel 3 of FIG. 20, the phase corrector (compensation value) of panel 5 may be expressed by a function of α, as in f(a)=α², for example.

Although the corrector may have maximum performance when feedback is given in SB and/or short-term periods, the feedback overhead may be saved by giving report/feedback in the same period as W1 PMI or in integer multiples thereof. The configuration of a matrix (compensation matrix) for the corrector may affect the method of indexing between all the panels and ports. Therefore, the port indexing direction may be pre-agreed between the base station and the UE or indicated to the UE by higher-layer signalling.

In another compensation method, compensation may be performed on a port or panel sub group in a panel that maintains the linear increments between antenna ports. This can be mathematically expressed by Equation 37:

$$W = W_c W_1 W_2 = \begin{bmatrix} I & 0 & & & & & & 0 \\ 0 & \alpha I & & & & & & \\ & & \beta I & & & \ddots & & \\ & & & \gamma I & & & & \vdots \\ \vdots & & \ddots & & I & & & \\ & & & & & \alpha I & & \\ & & & & & & \beta I & 0 \\ 0 & & \cdots & & & & 0 & \gamma I \end{bmatrix} \quad \text{[Equation 37]}$$

$$\begin{bmatrix} \tilde{W}_1 & 0 & & & & & & 0 \\ 0 & \tilde{W}_2 & & & & & & \\ & & \tilde{W}_3 & & & \ddots & & \\ & & & \tilde{W}_4 & & & & \vdots \\ \vdots & & \ddots & & \tilde{W}_1 & & & \\ & & & & & \tilde{W}_2 & & \\ & & & & & & \tilde{W}_3 & 0 \\ 0 & & \cdots & & & & 0 & \tilde{W}_4 \end{bmatrix} \begin{bmatrix} e_1 \\ e_2 \\ e_3 \\ e_4 \\ \phi_n e_1 \\ \phi_n e_2 \\ \phi_n e_3 \\ \phi_n e_4 \end{bmatrix}$$

where $W_c \in C^{N_1N_2 \times N_1N_2}$, $$\tilde{W}_{1r} \in C^{N_1'N_2' \times N_{W_1}'}$$

is defined as a W1 fat matrix configured by the number of ports set within one panel, and $I \in C^{N_1'N_2' \times N_1'N_2'}$. Also, W2 is a matrix that performs beam selection and co-phasing for each panel, which has been described assuming rank 1 in the above example but not limited thereto and may be expanded to a general W2 expression.

In the example described above and example to be described later, the co-phase is described as configured/reported alike for each panel for convenience of explanation, but it is needless to say that the co-phase may be configured/reported independently for each panel for performance improvement.

According to the method according to Equation 37, the following two cases may be taken into consideration: i) $\tilde{W}_1 \neq \tilde{W}_2 \neq \tilde{W}_3 \neq \tilde{W}_4$ and ii) $\tilde{W}_1 = \tilde{W}_2 = \tilde{W}_3 = \tilde{W}_4$.

i) As exemplified in FIG. 20, for example, an 8-port codebook is used for each panel, and different W1 beam groups are assumed for each panel. Thus, codebook granularity increases significantly, thereby increasing performance gain. However, the calculation complexity and the number of feedback bits may increase in proportion to the number of panels, as compared to ii). There is an advantage that complexity and the number of feedback bits can be reduced because of the use of a representative W1 beam group for each panel. In this case, as is the case with the codebooks of Equation 35 and/or 36, α, β, γ for panel compensation may have a particular complex value such as QPSK {1, −1, j, −j}, and their feedback periods may be equal to a W1 PMI period or integer multiples of the W1 PMI period.

According to the method according to Equation 37, an 8-port codebook is assumed for each panel, and Equation 37 may also apply to two 16-port panel sub-groups consisting of panels 1 and 2 and panels 3 and 4, respectively, in FIG. 20. To this end, the UE may additionally report information on the panel sub-groups to the base station. For example, if the base station informs the UE of the number of panels of each panel sub-group and the number of panels along the horizontal or vertical direction in each panel sub-group, then the UE may select a specific panel sub-group and report it to the base station. This sub panel group (i.e., the sub panel group reported by the UE) may be used for each digital codebook application, or may be used for the purpose of indicating a group to which the same analog beam is applied.

In a case where digital precoding is configured for each panel or for each sub panel group as in Equation 37, it may be desirable that port indexing is performed preferentially on "ports having the same polarization within one panel" in order to facilitate codebook configuration.

3-2) Panel/Sub Panel Group Selection Codebook

When different analog beamforming is performed/applied for each panel or for each sub panel group, it may be desirable to select a panel or sub panel group corresponding to the best analog beam and give CSI feedback. To this end, the We matrix in Equation 37 may be modified into a selection matrix as shown in Equation 38 and used.

$$W_s = \begin{bmatrix} \rho I & 0 & & & & & & 0 \\ 0 & \alpha I & & & & & & \\ & & \beta I & & & & & \\ & & & \gamma I & & & & \vdots \\ \vdots & & & \ddots & \rho I & & & \\ & & & & & \alpha I & & \\ & & & & & & \beta I & 0 \\ 0 & & & \cdots & & & 0 & \gamma I \end{bmatrix} \in C^{N_1 N_2 \times N_1 N_2},$$

[Equation 38]

$$\rho, \alpha, \beta, \gamma \in \{0, 1\}$$

where $$I \in C^{N_1' N_2' \times N_1' N_2'}.$$

If only one among $\rho$, $\alpha$, $\beta$, and $\gamma$ has a value of 1, single panel selection is performed (2-bit feedback is required in the above example), and if two or more among $\rho$, $\alpha$, $\beta$, and $\gamma$ have a value of 1, multi-panel selection is performed (4-bit feedback is required in the above example). In the latter case, the UE may expect that the same analog beam will be transmitted through the selected multi-panels.

Hence, when a PMI for panel selection is reported to the base station, the base station will find out that the UE is using only the ports in the panels corresponding to the reported PMI, and will activate the corresponding ports and deactivate the other ports for the corresponding UE and use them for other UEs' transmissions.

In the above example, assuming that two panels are selected, a total of 2*2*N1'*N2' ports are activated. In this case, the UE may apply a digital codebook corresponding to the 2*2*N1'*N2' ports and give a PMI/CQI/RI report. If a non-uniform port layout is configured by the UE's panel selection, a codebook, combined with the above-explained method of compensation between ports, may be applied/used for performance improvement.

When describing this embodiment in association with the base station's capability, if the base station has good calibration between panels, it may be desirable for it to perform digital beamforming using all of the 2*2*N1'*N2' ports. On the contrary, if the base station has no good calibration between panels, it may be desirable for it to perform digital beamforming on 2*N1'*N2' ports or NP*2*N1'*N2' ports corresponding to one panel or a specific NP number of panels. That is, a non-calibrated base station may indicate to the UE to configure/apply the panel selection codebook so as to prevent digital beamforming through port aggregation between panels. Alternatively, the UE, if it has a sufficiently high gain by analog beamforming thanks to a good geometry, may not highly require digital beamforming, and the UE may select a preferred panel(s) by using a panel selection codebook in order to reduce the complexity of codebook calculation.

To make the aforementioned panel selection codebook work properly, the base station may inform the UE of information about at least one among N1, N2, N1', and N2' by RRC or pre-agree with the UE. Moreover, the aforementioned codebooks may be used individually or in combination. In the latter case, for example, an analog beam selection codebook and a panel selection codebook may be used in combination. This example may apply when different analog beams are applied to different panels.

3-3) Panel/Sub Panel Group Combination Codebook

When a panel linear combination codebook is configured by modifying the aforementioned selection codebook, We may be configured by Equation 39.

$$W_c = \begin{bmatrix} \rho I & \alpha I & \beta I & \gamma I & 0 & 0 & 0 & 0 \\ 0 & 0 & 0 & 0 & \rho I & \alpha I & \beta I & \gamma I \end{bmatrix} \in C^{2N_1 N_2 \times N_1 N_2} =$$

[Equation 39]

$$\begin{bmatrix} \rho I & \alpha I & \beta I & \gamma I & 0 & 0 & 0 & 0 \\ 0 & 0 & 0 & 0 & \rho I & \alpha I & \beta I & \gamma I \end{bmatrix}$$

$$\begin{bmatrix} \tilde{W}_1 & 0 & & & & & & 0 \\ 0 & \tilde{W}_2 & & & & & & \\ & & \tilde{W}_3 & & \ddots & & & \\ & & & \tilde{W}_4 & & & & \vdots \\ \vdots & & & \ddots & \tilde{W}_1 & & & \\ & & & & & \tilde{W}_2 & & \\ & & & & & & \tilde{W}_3 & 0 \\ 0 & & & \cdots & & & 0 & \tilde{W}_4 \end{bmatrix} \begin{bmatrix} e_1 \\ e_2 \\ e_3 \\ e_4 \\ \phi_n e_1 \\ \phi_n e_2 \\ \phi_n e_3 \\ \phi_n e_4 \end{bmatrix} =$$

$$\begin{bmatrix} \rho \tilde{W}_1 e_1 + \alpha \tilde{W}_2 e_2 + \tilde{\beta W}_{x} e_3 + \tilde{\gamma W}_{x} e_4 \\ \phi_n(\rho \tilde{W}_1 e_1 + \alpha \tilde{W}_2 e_2 + \tilde{\beta W}_{x} e_3 + \tilde{\gamma W}_{x} e_4) \end{bmatrix}$$

Referring to Equation 39, the length of a column in the dimension of the final codebook is set to 2*N1'*N2', and this may be understood/interpreted that analog and digital beamformed vectors with the length of 2*N1'*N2' for each port are combined.

In the above method, the values of $\rho$, $\alpha$, $\beta$, and $\gamma$ may be expressed by $\rho = a \exp(kj\psi_a)$, $\alpha = a_b \exp(kj\psi_b)$, $\beta = a_c \exp(kj\psi_c)$, $\gamma = a_d \exp(kj\psi_d)$, for example. In this case, the amplitude component ($a_a$, $a_b$, $a_c$, $a_d$) and the phase component ($\psi_a, \psi_b, \psi_c, \psi_d$) may be reported independently or integrally. In an independent report, for example, the UE may report the amplitude component as wideband (or partial-band)/long-term and the phase component as wideband/subband, individually. Because a combination is done, the amplitude (a) may be set to one of the values {1,0.5,0.25,0}, and the phase ($\psi$) may be set to one of the values QPSK {1,−1,j,−j}.

To save the payload size, the number of combined panels may be limited to a specific number, and this number of panels may be signalled by RRC (or MAC (Medium Access Control) CE (Control Element)) or may be pre-agreed between the UE and the base station. That is, in the above example, if the number of combined panels is assumed to be 2, the UE may report the power index 0 for the least preferred two panel indices or may select two panels first at the front end of the panel combination codebook. That is, in a case where two beams out of four panel beams are combined, if indices are allocated for each combination of panels, as in {(1,2), (1,3), (1,4), (2,3), (2,4), (3,4)}, the UE may first report a particular index selected by them to the base station and then perform the panel combination codebook for the selected panels. Moreover, it may be inefficient to report each value corresponding all power combining coefficients. Thus, the power combining coefficient for a particular panel (i.e., a panel with the highest beam gain or the first panel as default) may be assumed/set to be a specific value, and the UE may report only the power combining coefficient for the other combined beam. For example, if the power of the first panel is assumed to be '1', the UE may report the amplitude values of α, β, and γ corresponding to the other panel.

In the panel combination codebook proposed above, the base station may configure whether the UE will use the same codebook or phase compensation (WB and/or SB) for each panel or different codebooks or phase combinations for each panel.

In the case of a codebook with different beam groups for each polarization, if the above-explained panel compensation codebook is applied, the values of ρ, α, β, and γ may be set/applied independently for each polarization. That is, $\rho\_1$, $\alpha\_1$, $\beta\_1$, and $\gamma\_1$ for the first polarization and $\rho\_2$, $\alpha\_2$, $\beta\_2$, and $\gamma\_2$ for the second polarization—i.e., a total of 8 independent variables—may be used to perform panel compensation.

Similarly to the method proposed above, a codebook for indicating/reporting a differential in compensation value between a panel and a reference panel may be considered/proposed.

The proposed compensation codebook may be extensively applied as an SB panel correction codebook, as well as a WB panel correction codebook. This may increase the payload for SB CSI feedback, but a panel calibration codebook may be applied for each SB, which reflects frequency selectivity better and therefore leads to a very large improvement in performance. However, to solve the problem of the payload increase, the feedback granularity/unit/size/bit-width of the SB panel corrector may be set/defined differently from the feedback granularity/unit/size/bit-width of the WB panel corrector. Particularly, to reduce feedback overhead, the feedback granularity/unit/size/bit-width of the SB panel corrector may be set/defined to be smaller than the feedback granularity/unit/size/bit-width of the WB panel corrector (that is, the feedback granularity of the SB panel corrector is lower than the feedback granularity of the WB panel corrector). For example, the feedback granularity/unit/size/bit-width of the WB panel corrector may be set to 2 bits (in QPSK), and the feedback granularity/unit/size/bit-width of the SB panel corrector may be set to 1 bit (in BPSK).

In this case, the UE may give the base station a recommendation/feedback about whether to use the WB and/or SB panel correction codebook. And/or, the base station may configure whether or not the UE uses the WB and/or SB panel correction codebook by RRC configuration. For example, the application of the WB panel correction codebook may be defined as a first mode, and the application of both the WB and SB panel correction codebooks may be defined as a second mode, and the base station may indicate to the UE which mode to apply through specific RRC signalling (e.g., 'CodebookMode'). When the first mode is set, the UE may report to the base station the WB panel corrector selected/derived based on QPSK in a 2-bit size by CSI (particularly, PMI). When the second mode is set, the UE may report to the base station the WB panel corrector selected/derived based on QPSK in a 2-bit size and the SB panel corrector selected/derived based on BPSK in a 1-bit size by CSI (particularly, PMI). In the second mode, the WB panel corrector may be used to compensate for the overall co-phase, and the SB panel corrector may be used to compensate for the overall co-phase, and the SB panel corrector may be used to finely compensate for the co-phase.

Alternatively, whether to use the WB panel correction codebook or the SB panel correction codebook may be tied to the number (=Mg*Ng) of panels of the base station. For example, for Mg*Ng=4, the number N_W1 of beams of W1 in a digital codebook may be set/applied to 1, and, for Mg*Ng=2, the number N_W2 of beams of W1 in a digital codebook may be set/applied to 2 (N_W1=2).

While the proposed codebook has been described with respect to DL, it is not limited thereto but may be readily and extensively applicable to UL codebook configuration.

Hereinafter, Type 1 codebook configuration assuming a single panel will be described.

First of all, the use of the same beam group will be described, which may be expressed as in Equation 40:

$$W_1 = \begin{bmatrix} B & 0 \\ 0 & B \end{bmatrix} \qquad \text{[Equation 40]}$$

where W1 performs beam grouping with WB/long-term characteristics in the dual-stage codebook. In this case, $B \in \mathbb{C}^{N_1 N_2 \times L}$, and B may have L values (e.g., L=1,2,4,7, ...). Although N_W1 has been used before indicating the number of beam groups of W1, it will be hereinafter replaced with L. Now, a description will be given of a case where the UE selects L beams.

The UE may freely and explicitly indicate L beams being used to the base station in an explicit fashion (e.g., in bitmap form or by indicating the beam index). In this case, the number of required bits is L*N1*N2*O1*O2 or $\lceil \log_2(LN_1N_2O_1O_2) \rceil$, and there is a problem that the feedback bits increase as L and the number of Tx antenna ports increases. Accordingly, the UE may freely select beams within a specific GoB (Grid of Beams) as a way to cut down the number of feedback bits. An example of this will be described below with reference to FIG. 21.

Figure 21:
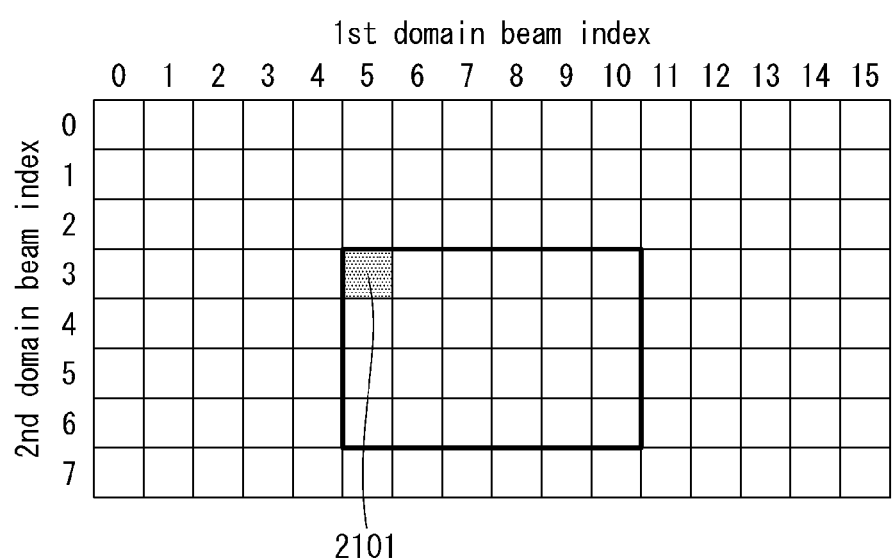
FIG. 21 is a view illustrating GoB for N1=4, O1=4, N2=2, and O2=4 according to an exemplary embodiment of the present invention.

FIG. 21 is a view illustrating GoB for N1=4, O1=4, N2=2, and O2=4 according to an exemplary embodiment of the present invention.

Referring to FIG. 21, when a beam selection window of 4 by 6 is configured, the UE may freely select L−1 beams within this window. In this case, the UE may give feedback about the position of a primary/leading beam 2101 and the window size of 4 by 6.

Figure 22:
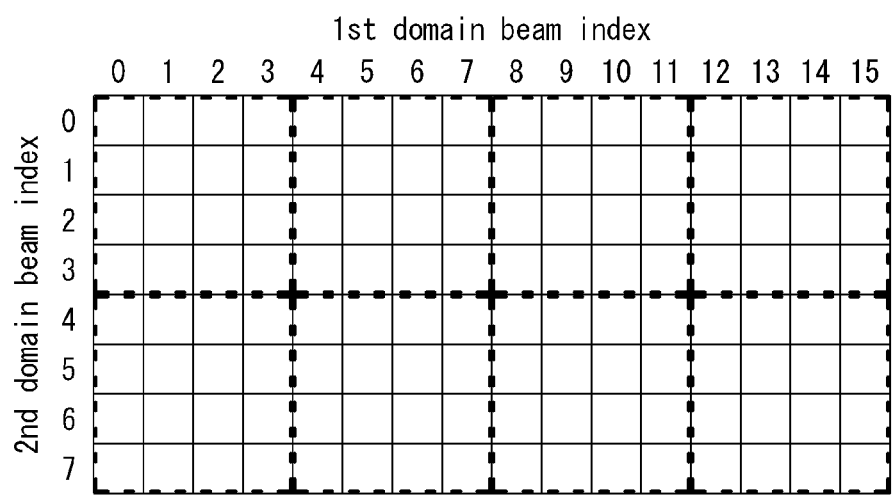
FIG. 22 is a view illustrating a window configuration method for N1=4, O1=4, N2=2, and O2=4 according to an exemplary embodiment of the present invention.

In another method, an exemplary embodiment of FIG. 22 may be applied.

FIG. 22 is a view illustrating a window configuration method for N1=4, O1=4, N2=2, and O2=4 according to an exemplary embodiment of the present invention.

Referring to FIG. 22, the entire GoB is divided into windows of a size recommended/fed back by the base station or UE, and the UE may give feedback on the index (position) of a window and/or information on the selection of L beams freely selected within that window. FIG. 22 illustrates the existence of 8 windows of 4 by 6. According to the configuration, adjacent windows may overlap. In this case, the base station may configure information on the positions and/or size of the windows for the UE.

If the UE selects L beams used for W1, as proposed above, high feedback bitrate is required. Thus, feedback information (e.g., information on the selection of L beams) may be limited to using PUCCH reporting, rather than using PUSCH reporting.

Hereinafter, different diagonal matrices forming W1 (i.e., different beam groups used for each polarization) will be described, which can be expressed as in Equation 41.

$$W_1 = \begin{bmatrix} B_1 & 0 \\ 0 & B_2 \end{bmatrix}$$ [Equation 41]

where $B_1 \neq B_2$, and B1 and B2 may have different dimensions. $B_i \in C^{N_1 N_2 \times L_i}$ (i=1,2) is defined, $L_i$ represents the number of beams in a beam group of i-slant (e.g., i=1 H slant, and i=2 V slant), and L1 and L2 may have different values (e.g., L1=1, and L2=2). The base station may pre-agree with the UE about the L1 and L2 values, or may configure these values for the UE by a higher layer (e.g., RRC or MAC CE). Alternatively, the UE may give the base station a recommendation/feedback about information on the L1 and L2 values.

Configuring W1 as above has the advantage of applying the best codeword for each polarization but has the disadvantage of significantly increasing the feedback overhead of W1. Accordingly, an exemplary embodiment for solving these disadvantages will be proposed.

Firstly, $L_1=L_2$ (i.e., if the number of vertical beams and the number of horizontal beams are equal) will be described.

In this case, W2 for rank 1 codebook configuration will be proposed as in Equation 42.

$$W_2 = \begin{bmatrix} e_i \\ \phi_n e_j \end{bmatrix}$$ [Equation 42]

where $i \neq j$, $i, j \in \{1, \ldots, L\}$ and $\phi_n=\{1, j, -1, -j\}$ are defined, and $e_i$ represents a selection vector whose length is L and whose ith element has a value of 1 and the other elements has a value of 0. In this case, i and j must be reported individually, and twice as much feedback overhead is consumed for beam selection as compared to when the same beam group is used. For this design, i, j, and co-phase values may be reported as SB. To reduce the SB feedback overhead for beam selection, L1=L2=1 should be satisfied. In this case, W2 may be set to $$W_2 = \begin{bmatrix} 1 \\ \phi_n \end{bmatrix}$$

In another method, the UE may give report/feedback about i11 and i12 for B1 and give additional report/feedback about the differential between B1 and B2. Here, i11 and i12 represent the first and second domain indices of W1 PMI as in LTE codebooks. That is, the UE may give feedback/report to the base station about how far B2 is spaced apart from the leading beam indices i11 and i12 of B1 in the first and second domains. For example, when the leading beam index (i11, i12) of B1 is (10,2) and a value corresponding to (2,4) as the differential of B1 is additionally reported/fed back to the base station, the base station may recognize the leading beam (i11, i12) of B2 as (12,6) and configure B2.

In this method of indicating the differential between B1 (index) and B2 (index), the differential may be agreed between the UE and the base station as a specific value for each domain, or the base station may configure the differential for the UE, or the UE may give report/feedback to the base station. To reduce the report/feedback overhead, the UE may give feedback only about information on the specific domain (e.g., first or second domain). In this case, the base station may configure the specific domain for the UE, or the UE may inform the base station of the specific domain.

The rank 2 codebook configuration may be expressed as in Equation 43:

$$W_2 = \begin{bmatrix} e_i & e_k \\ \phi_n e_j & -\phi_n e_l \end{bmatrix}$$ [Equation 43]

As can be seen from Equation 43, variables of i, j, k, and l should meet the following conditions to maintain the orthogonality for each layer in the rank 2 codebook.

1. $e_i=e_k$, $e_j=e_l$: In this case, the codebook indicates that the same beam is selected for each polarization when configuring a layer. When configuring the codebook, $\phi_n$ may be limited to $\phi_n=\{1,j\}$, for example. In this case, beams forming the codebook may be normalized to 1.

2. $\{e_i \neq e_k\}, \{e_j \neq e_l\}$: In this case, B1 of W1 should be configured for each polarization so that beams selected by i and k are orthogonal to each other, and B2 of W1 should be configured for each polarization so that beams selected by j and l are orthogonal to each other. That is, beam groups of B1 and B2 of W1 should consist of beams orthogonal to each other. Alternatively, if there are some non-orthogonal beams, the codebook may be configured by pairing orthogonal beams in the above method. For example, for $B_1=[b_0 \; b_1 \; b_{O_1} \; b_{1+O_1}]$, assuming that $b_0$, $b_{O_1}$ are orthogonal to each other and $b_1$, $b_{1+O_1}$ are orthogonal to each other $b_0$, $b_{O_1}$ and $b_1$, $b_{1+O_1}$ may be paired according to the above second method—that is, pairing may be done two times in total. In this method, co-phase of $\phi_n=\{1,j,-1,-j\}$ may be used.

Hereinafter, $L_1 \neq L_2$ will be discussed. In this case, a codebook may be configured by extensively applying the above method proposed for $L_1=L_2$.

As a special example of $L_1 \neq L_2$, L1=1 will be described first. In this case, the rank 1 configuration of W2 is as shown in Equation 44:

$$W_2 = \begin{bmatrix} 1 \\ \phi_n e_i \end{bmatrix}$$ [Equation 44]

In this case, beam selection and co-phasing are possible for beams corresponding to one slant. Thus, a PMI may be determined/indicated independently for each polarization, thereby increasing codebook granularity and improving performance. In this case, $\phi_n=\{1, j, -1, -j\}$ may be used.

When designing the codebook as above, the codebook may be configured in such a way that $B_1 \subset B_2$ is established (that is, L beams of B2 always include B1) to form a super-set of LTE Class A codebook Config 1. Alternatively, the UE may recommend information on B2 to the base station.

Similarly, rank 2 codebook may be configured as in Equation 45:

$$W_2 = \begin{bmatrix} 1 & 1 \\ \phi_n e_i & -\phi_n e_j \end{bmatrix}$$ [Equation 45]

For $e_i = e_j$, $\phi_n = \{1, j\}$ may be used, and for $e_i \neq e_j$, if beams selected as i and j are orthogonal to each other, $\phi_n = \{1, j, -1, -j\}$ may be used. Alternatively, co-phase with the same granularity may be applied to both of the two cases.

In the above-explained method, WB co-phase for beams of $B_2$ may be reported along with the B2 index. That is, $\tilde{B}_2 = \psi_n B_2$ may be set, and W1 may be configured as in Equation 46.

$$W_1 = \begin{bmatrix} B_1 & 0 \\ 0 & \tilde{B}_2 \end{bmatrix}$$ [Equation 46]

where $\psi_n$ is a WB co-phase value, for example, $\psi_n = \{1, j, -1, -j\}$. In this case, SB co-phase may be configured as in $$\phi_n = \left\{ \frac{1+j}{\sqrt{2}}, \frac{1-j}{\sqrt{2}}, \frac{-1+j}{\sqrt{2}}, \frac{-1-j}{\sqrt{2}} \right\}.$$

for example, to have a different co-phase from WB, thereby increasing codebook granularity. To save SB feedback bits, the UE may report 2-level co-phase by using 1-bit co-phase $$\left( e.g., \phi_n = \left\{ 1, \frac{1+j}{\sqrt{2}} \right\} \right).$$

The proposed method is readily applicable to $B_1 = B_2$ and B1 and B2 of W1 may be configured/applied independently for each band (or band group).

As described above, similarly to the method of using different beam groups for each polarization, the SB size may be reduced to increase the accuracy of SB PMI. Once the SB size is reduced, PMI per SB can be more accurate but feedback overhead increases. Accordingly, the base station may configure, for the UE, whether to reduce the SB size and/or use a codebook of $B_1 \neq B_2$.

A new codebook may be configured by combining the above-proposed codebook designs.

Figure 23:
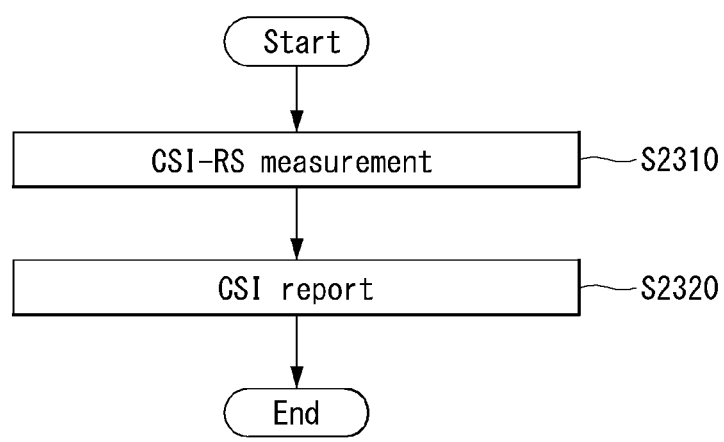
FIG. 23 is a flowchart illustrating a method for a UE to report CSI according to an exemplary embodiment of the present invention.

FIG. 23 is a flowchart illustrating a method for a UE to report CSI according to an exemplary embodiment of the present invention. Regarding this flowchart, the foregoing embodiments/descriptions may apply equally or similarly, and redundant explanation will be omitted.

First of all, the UE may measure a CSI-RS transmitted from the base station through multiple panels (S2310).

Next, the UE may report to the base station CSI generated based on the CSI-RS measurement (S2320).

In this case, if the UE reports a WB panel corrector and SB panel corrector for the multiple panels as the CSI (according to the CSI settings by the base station), the WB panel corrector and the SB panel corrector may be reported with different bit widths. Here, the WB panel corrector may correspond to a beam/codebook phase corrector for each panel derived/determined/selected based on the measurement of CSI-RS (resources) for WB, and the SB panel corrector may correspond to a beam/codebook phase corrector for each panel derived/determined/selected based on the measurement of CSI-RS (resources) for SB (or for each SB). That is, the WB panel corrector and the SB panel corrector may be used for phase correction between the multiple panels. The number of panels may be set by higher-layer signalling.

Particularly, the bit width of the SB panel corrector may be shorter than the bit width of the WB panel corrector—for example, the bit width of the SB panel corrector may be set to 1 bit, and the bit width of the WB panel corrector may be set to 2 bits. Thus, the WB panel corrector may be reported based on QPSK, and the SB panel corrector may be reported based on BPSK. If the UE reports only the WB panel corrector as the CSI, the WB panel corrector may be reported with a bit width of 2 bits. Whether to report both the WB panel corrector and the SB panel corrector or only the WB panel corrector may be determined according to the mode set by the base station (e.g., the mode set by RRC signalling). For example, if the base station indicates mode '1' to the UE, the UE may recognize that only the WB panel corrector is reported, and if the base station indicates mode '2', the UE may recognize that both the WB panel corrector and the SB panel corrector are reported.

The WB panel corrector and the SB panel corrector may be included in a PMI within the CSI when reported. Also, the WB panel corrector and the SB panel corrector may be reported independently for each of the plurality of panels.

General Devices to which the Present Invention is Applicable

Figure 24:
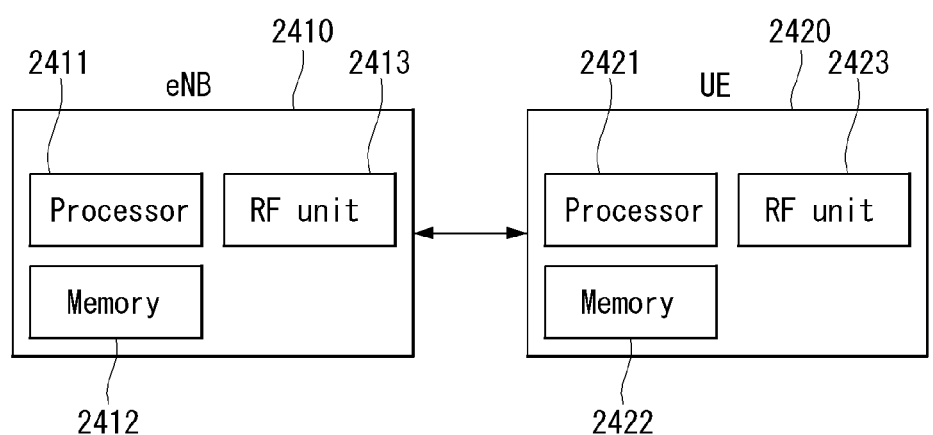
FIG. 24 illustrates a block diagram of a wireless communication system according to an exemplary embodiment of the present invention.

FIG. 24 illustrates a block diagram of a wireless communication system according to an exemplary embodiment of the present invention.

Referring to FIG. 24, the wireless communication system includes a base station 2410 and a plurality of UEs 2420 located within the region of the base station 2410. The base station 2410 includes a processor 2411, a memory 2412, and an RF (radio frequency) unit 2413. The processor 2411 implements the functions, processes and/or methods proposed above. The layers of wireless interface protocol may be implemented by the processor 2411. The memory 2412 is connected to the processor 2411, and stores various types of information for driving the processor 2411. The RF unit 2413 is connected to the processor 2411, and transmits and/or receives radio signals.

The UE 2420 includes a processor 2421, a memory 2422, and an RF unit 2423. The processor 2421 implements the functions, processes and/or methods proposed above. The layers of wireless interface protocol may be implemented by the processor 2421. The memory 2422 is connected to the processor 2421, and stores various types of information for driving the processor 2421. The RF unit 2423 is connected to the processor 2421, and transmits and/or receives radio signals.

The memories 2412 and 2422 may be located interior or exterior to the processors 2411 and 2421, and may be connected to the processors 2411 and 2421 by well-known various means. In addition, the base station 2410 and/or the UE 2420 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In the present description, "A and/or B" can be interpreted as "at least one of A and B".

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

A variety of embodiments of the present invention have been described in the best mode for carrying out the invention.

While the present invention has been described mainly with respect to an example of application of 3GPP LTE/LTE-A systems, it may be applied to various wireless communication systems, in addition to the 3GPP LTE/LTE-A systems.

The invention claimed is:

1. A method performed by a terminal in a wireless communication system, the method comprising:
   receiving, from a base station, codebook configuration information including information related to a multi-panel codebook,
   wherein, based on the information related to the multi-panel codebook, (i) a number of a plurality of panels, (ii) a number of a first antenna ports within a first domain of each of the plurality of panels, and (iii) a number of a second antenna ports within a second domain of each of the plurality of panels are configured;
   receiving, from the base station, a Channel State Information (CSI)-Reference Signal (RS),
   wherein a number of CSI-RS ports related to the CSI-RS is based on a product of the number of the plurality of panels, the number of the first antenna ports, and the number of the second antenna ports; and
   reporting, to the base station, CSI that is computed based on the CSI-RS,
   wherein reporting the CSI related to a Precoding Matrix Indicator (PMI) comprises:
      reporting first information related to the PMI for wideband; and
      reporting second information related to the PMI for each subband,
   wherein the first information related to the PMI for wideband includes first fields and a bitwidth of each of the first fields is 2,
   wherein the second information related to the PMI for each subband includes second fields and a bitwidth of each of the second fields is 1,
   wherein the first fields and the second fields are used for phase compensation for the plurality of panels, and
   wherein the phase compensation for the plurality of panels is applied by compensating for a phase difference between a reference panel, which is one of the plurality of panels, and each of the panels other than the reference panel.

2. The method of claim 1, wherein the codebook configuration information is received based on higher-layer signaling.

3. The method of claim 2, wherein the reporting of the first information related to the PMI for wideband and the second information related to the PMI for each subband is set by the codebook configuration information.

4. The method of claim 2, wherein the first information related to the PMI for wideband and the second information related to the PMI for each subband are reported independently at least for each of the plurality of panels or for each of a plurality of polarizations.

5. The method of claim 1, wherein each of the plurality of panels comprise a plurality of antenna elements, and
   wherein the first fields and the second fields provide phase compensation for antenna elements between the reference panel and each of the panels other than the reference panel.

6. The method of claim 1, wherein each of the first fields provides a first compensation amount for an overall co-phase, and each of the second fields provides a second compensation amount for the overall co-phase, in addition to the first compensation amount.

7. A terminal operating in a wireless communication system, the terminal comprising:
   a radio frequency, RF, unit;
   at least one processor; and
   at least one computer memory operably connectable to the at least one processor and storing instructions that, based on being executed by the at least one processor, perform operations comprising:
   receiving, from a base station, codebook configuration information including information related to a multi-panel codebook,
   wherein, based on the information related to the multi-panel codebook, (i) a number of a plurality of panels, a number of a first antenna ports within a first domain of each of the plurality of panels, and (iii) a number of a second antenna ports within a second domain of each of the plurality of panels are configured;
   receiving, from the base station, a Channel State Information (CSI)-Reference Signal (RS),
   wherein a number of CSI-RS ports related to the CSI-RS is based on a product of the number of the plurality of panels, the number of the first antenna ports and the number of the second antenna ports; and reporting, to the base station, CSI that is computed based on the CSI-RS, wherein reporting the CSI related to a Precoding Matrix Indicator (PMI) comprises:

reporting first information related to the PMI for wideband; and reporting second information related to the PMI for each subband, wherein the first information related to the PMI for wideband includes first fields and a bitwidth of each of the first fields is 2, wherein the second information related to the PMI for each subband includes second fields and a bitwidth of each of the second fields is 1, wherein the first fields and the second fields are used for phase compensation for the plurality of panels, and wherein the phase compensation for the plurality of panels is applied by compensating for a phase difference between a reference panel, which is one of the plurality of panels, and each of the panels other than the reference panel.

8. The terminal of claim 7, wherein each of the plurality of panels comprise a plurality of antenna elements, and wherein the first fields and the second fields provide phase compensation for antenna elements between the reference panel and each of the panels other than the reference panel.

9. The terminal of claim 7, wherein each of the first fields provides a first compensation amount for an overall co-phase, and each of the second fields provides a second compensation amount for the overall co-phase, in addition to the first compensation amount.

10. A method performed by a base station in a wireless communication system, the method comprising:

transmitting, to a terminal, codebook configuration information including information related to a multi-panel codebook, wherein, based on the information related to the multi-panel codebook, (i) a number of a plurality of panels, (ii) a number of a first antenna ports within a first domain of each of the plurality of panels, and (iii) a number of a second antenna ports within a second domain of each of the plurality of panels are configured;

transmitting, to the terminal, a Channel State Information (CSI)-Reference Signal (RS), wherein a number of CSI-RS ports related to the CSI-RS is based on a product of the number of the plurality of panels, the number of the first antenna ports and the number of the second antenna ports; and receiving, from the terminal, CSI that is computed based on the CSI-RS, wherein receiving the CSI related to a Precoding Matrix Indicator (PMI) comprises:

receiving first information related to the PMI for wideband; and receiving second information related to the PMI for each subband, wherein the first information related to the PMI for wideband includes first fields and a bitwidth of each of the first fields is 2, wherein the second information related to the PMI for each subband includes second fields and a bitwidth of each of the second fields is 1, wherein the first fields and the second fields are used for phase compensation for the plurality of panels, and wherein the phase compensation for the plurality of panels is applied by compensating for a phase difference between a reference panel, which is one of the plurality of panels, and each of the panels other than the reference panel.

11. A base station operating in a wireless communication system, the base station comprising:

a radio frequency, RF, unit;

at least one processor; and at least one computer memory operably connectable to the at least one processor and storing instructions that, based on being executed by the at least one processor, perform operations comprising:

transmitting, to a terminal, codebook configuration information including information related to a multi-panel codebook, wherein, based on the information related to the multi-panel codebook, (i) a number of a plurality of panels, (ii) a number of a first antenna ports within a first domain of each of the plurality of panels, and (iii) a number of a second antenna ports within a second domain of each of the plurality of panels are configured; and transmitting, to the terminal, a Channel State Information (CSI)-Reference Signal (RS), wherein a number of CSI-RS ports related to the CSI-RS is based on a product of the number of the plurality of panels, the number of the first antenna ports and the number of the second antenna ports; and receiving, from the terminal, CSI that is computed based on the CSI-RS, wherein receiving the CSI related to a Precoding Matrix Indicator (PMI) comprises:

receiving first information related to the PMI for wideband; and receiving second information related to the PMI for each subband, wherein the first information related to the PMI for wideband includes first fields and a bitwidth of each of the first fields is, wherein the second information related to the PMI for each subband includes second fields and a bitwidth of each of the second fields is 1, wherein the first fields and the second fields are used for phase compensation for the plurality of panels, and wherein the phase compensation for the plurality of panels is applied by compensating for a phase difference between a reference panel, which is one of the plurality of panels, and each of the panels other than the reference panel.

12. A non-transitory computer readable medium (CRM) storing one or more instructions, comprising:

wherein the one or more instructions executable by one or more processors causes a terminal to:

receive, from a base station, codebook configuration information including information related to a multi-panel codebook, wherein, based on the information related to the multi-panel codebook, (i) a number of a plurality of panels, (ii) a number of a first antenna ports within a first domain of each of the plurality of panels and (iii) a number of a second antenna ports within a second domain of each of the plurality of panels are configured;

receiving, from the base station, a Channel State Information (CSI)-Reference (RS), wherein a number of CSI-RS ports related to the CSI-RS is based on a product of the number of the plurality of panels, the number of the first antenna ports and the number of the second antenna ports; and report, to the base station, CSI that is computed based on the CSI-RS, wherein report the CSI related to a Precoding Matrix Indicator (PMI) comprises:

reporting first information related to the PMI for wideband; and reporting second information related to the PMI for each subband, wherein the first information related to the PMI for wideband includes first fields and a bitwidth of each of the first fields is 2, wherein the second information related to the PMI for each subband includes second fields and a bitwidth of each of the second fields is 1, wherein the first fields and the second fields are used for phase compensation for the plurality of panels, and wherein the phase compensation for the plurality of panels is applied by compensating for a phase difference between a reference panel, which is one of the plurality of panels, and each of the panels other than the reference panel.

13. An apparatus comprising one or more memories and one or more processors operatively coupled to the one or more memories, the apparatus comprising:

wherein the one or more processors control the apparatus to:

receive, from a base station, codebook configuration information including information related to a multi-panel codebook, wherein, based on the information related to the multi-panel codebook, (i) a number of a plurality of panels, (ii) a number of a first antenna ports within a first domain of each of the plurality of panels, and (iii) a number of a second antenna ports within a second domain of each of the plurality of panels are configured;

receiving, from the base station, a Channel State Information (CSI)-Reference (RS), wherein a number of CSI-RS ports related to the CSI-RS is based on a product of the number of the plurality of panels, the number of the first antenna ports and the number of the second antenna ports; and report, to the base station, CSI that is computed based on the CSI-RS, wherein report the CSI related to a Precoding Matrix Indicator (PMI) comprises:

reporting first information related to the PMI for wideband; and reporting second information related to the PMI for each subband, wherein the first information related to the PMI for wideband includes first fields and a bitwidth of each of the first fields is 2, wherein the second information related to the PMI for each subband includes second fields and a bitwidth of each of the second fields is 1, wherein the first fields and the second fields are used for phase compensation for the plurality of panels, and wherein the phase compensation for the plurality of panels is applied by compensating for a phase difference between a reference panel, which is one of the plurality of panels, and each of the panels other than the reference panel.

* * * * *